(12) United States Patent
Takeo et al.

(10) Patent No.: US 7,126,707 B2
(45) Date of Patent: Oct. 24, 2006

(54) INFORMATION PROCESSING APPARATUS ISSUING JOB TO PERIPHERAL DEVICE AND METHOD FOR ISSUING JOB TO PERIPHERAL DEVICE

(75) Inventors: Akinori Takeo, Kanagawa (JP); Takashi Inoue, Kanagawa (JP); Tomoko Takagi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 970 days.

(21) Appl. No.: 09/911,690

(22) Filed: Jul. 25, 2001

(65) Prior Publication Data

US 2002/0026538 A1     Feb. 28, 2002

(30) Foreign Application Priority Data

Jul. 25, 2000 (JP) .............................. 2000-224474
Nov. 8, 2000 (JP) .............................. 2000-340195
Jul. 24, 2001 (JP) .............................. 2001-223068

(51) Int. Cl.
*G06F 15/00* (2006.01)
(52) U.S. Cl. ..................................... 358/1.15; 358/1.13
(58) Field of Classification Search ................. 358/1.1, 358/1.15; 399/8, 9, 16, 18, 19, 81, 67; 707/10; 710/260, 268; 400/76; 700/115; 709/217, 709/206
See application file for complete search history.

(56) References Cited

U.S. PATENT DOCUMENTS

| 5,204,936 | A | 4/1993 | Kaneko et al. ................ 395/11 |
| 5,894,553 | A | 4/1999 | Kawazome et al. ........ 395/200 |
| 5,926,633 | A | 7/1999 | Takagi et al. ................ 395/566 |
| 5,996,003 | A | 11/1999 | Namikata et al. ........... 709/205 |
| 6,707,574 | B1* | 3/2004 | Freeman et al. ............. 358/1.9 |
| 2004/0184074 | A2* | 9/2004 | Leiman et al. ............. 358/1.15 |
| 2004/0223177 | A1* | 11/2004 | Takagi et al. .............. 358/1.13 |

OTHER PUBLICATIONS

U.S. Appl. No. 09/448,593, filed Nov. 24, 1999, Matsuo, T., et al.
U.S. Appl. No. 09/442,992, filed Nov. 19, 1999, Sasaki, Y., et al.

\* cited by examiner

*Primary Examiner*—King Y. Poon
*Assistant Examiner*—Saeid Ebrahimi-Dehkordy
(74) *Attorney, Agent, or Firm*—Fitzpatrick, Cella, Harper & Scinto

(57) ABSTRACT

The invention enables the user to designate a start mode even if the driver software, controlling the peripheral device, does not know the start mode (start timing and condition for the job processing) settable in the peripheral device, at the installation.

The driver software requests, to the peripheral device, a list of the attribute values settable for the start mode, then displays the attribute values in the list to the user, and sets the attribute value, designated in the list, as the job attribute.

12 Claims, 30 Drawing Sheets

FIG. 6

| | ATTRIBUTE NAME | SETTING | CHANGING | ACQUIRING |
|---|---|---|---|---|
| | | 61 | 62 | 63 | 64 |
| 65-1 | JOB ID | FALSE | FALSE | TRUE |
| 65-2 | JOB NAME | TRUE | FALSE | TRUE |
| 65-3 | JOB TYPE | TRUE | FALSE | TRUE |
| 65-4 | PASSWORD | TRUE | FALSE | FALSE |
| 65-5 | SHEET SELECTION | TRUE | FALSE | TRUE |
| | .... | .... | .... | .... |
| 65-6 | DUPLEX PRINT | TRUE | TRUE | TRUE |
| 65-7 | START MODE | TRUE | FALSE | TRUE |

FIG. 7

| | |
|---|---|
| 301 | DESIGNATE START TIME WITH ABSOLUTE TIME |
| 302 | DESIGNATE START TIME WITH RELATIVE TIME |
| 303 | WAIT COMMAND WITH PASSWORD |
| 304 | WAIT START COMMAND |
| 305 | START IMMEDIATELY |

FIG. 17

MEMORY MAP OF MEM MEDIUM (FD/CD-ROM)

| DIRECTORY |
|---|
| 1ST DATA PROCESSING PROGRAM<br>PROGRAM CODES FOR FLOWCHART OF FIG.8 |
| 2ND DATA PROCESSING PROGRAM<br>PROGRAM CODES FOR FLOWCHART OF FIG.11 |
| 3RD DATA PROCESSING PROGRAM<br>PROGRAM CODES FOR FLOWCHART OF FIG.12 |
| 4TH DATA PROCESSING PROGRAM<br>PROGRAM CODES FOR FLOWCHART OF FIG.13 |
| 5TH DATA PROCESSING PROGRAM<br>PROGRAM CODES FOR FLOWCHART OF FIG.14 |
| 6TH DATA PROCESSING PROGRAM<br>PROGRAM CODES FOR FLOWCHART OF FIG.15 |
| 7TH DATA PROCESSING PROGRAM<br>PROGRAM CODES FOR FLOWCHART OF FIG.16 |

FIG. 18

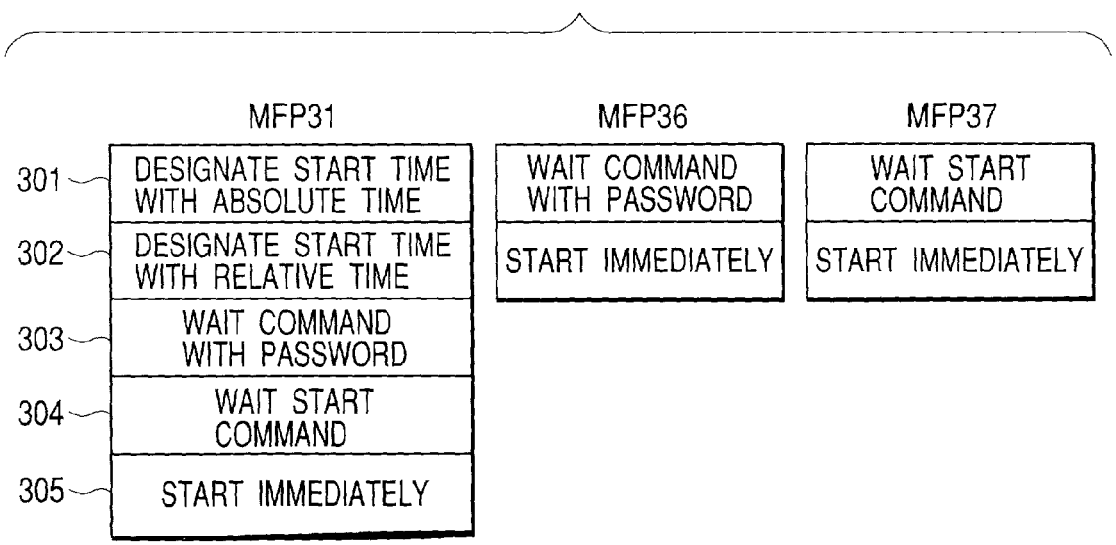

FIG. 26

| | |
|---|---|
| 2601 | NORMAL EXECUTION |
| 2602 | INTERRUPT EXECUTION |
| 2603 | NORMAL EXECUTION WITH STORING |
| 2604 | INTERRUPT EXECUTION WITH STORING |
| 2605 | STORING ONLY |
| 2606 | NORMAL EXECUTION WITH GUARANTEE |
| 2607 | NORMAL EXECUTION WITH GUARANTEE AND STORING |

FIG. 27

| | |
|---|---|
| 2701 | STORAGE AREA 1 |
| 2702 | STORAGE AREA 2 |
| 2703 | STORAGE AREA 3 |
| 2704 | STORAGE AREA 4 |
| 2705 | STORAGE AREA 5 |
| 2706 | STORAGE AREA 6 |
| 2707 | STORAGE AREA 7 |
| 2708 | STORAGE AREA 8 |
| 2709 | STORAGE AREA 9 |

FIG. 28

| | |
|---|---|
| 2801 | STORAGE AREA 8 |

FIG. 34

| ATTRIBUTE NAME | SETTING | CHANGING | ACQUIRING |
|---|---|---|---|
| JOB ID | FALSE | FALSE | TRUE |
| JOB NAME | TRUE | FALSE | TRUE |
| JOB TYPE | TRUE | FALSE | TRUE |
| PASSWORD | TRUE | FALSE | FALSE |
| SHEET SELECTION | TRUE | FALSE | TRUE |
| ... | ... | ... | ... |
| DUPLEX PRINT | TRUE | TRUE | TRUE |
| JOB DELETION | TRUE | FALSE | TRUE |

FIG. 35
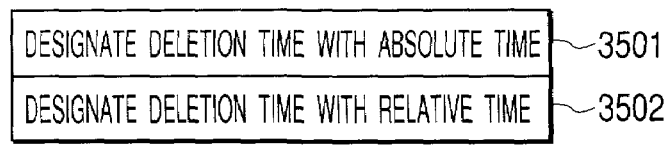
- DESIGNATE DELETION TIME WITH ABSOLUTE TIME — 3501
- DESIGNATE DELETION TIME WITH RELATIVE TIME — 3502
FIG. 36
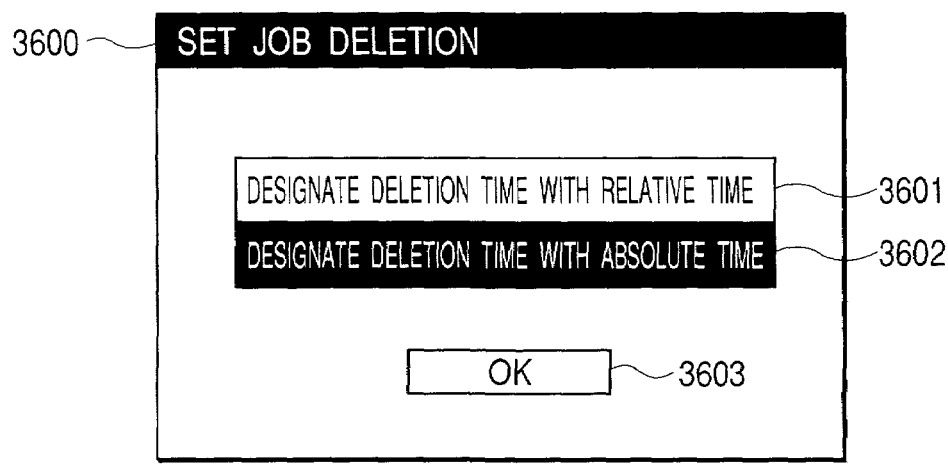
3600 — SET JOB DELETION
- DESIGNATE DELETION TIME WITH RELATIVE TIME — 3601
- DESIGNATE DELETION TIME WITH ABSOLUTE TIME — 3602
OK — 3603
FIG. 37
3700 — DELETION TIME (ABSOLUTE)
VALID THRU — 3703
2000/01/25/12:00
DESIGNATE  2000/01/23/12:00 — 3701
☑ DELETE EVEN IN PROCESS OF EXECUTING JOB — 3704
OK — 3702

INFORMATION PROCESSING APPARATUS ISSUING JOB TO PERIPHERAL DEVICE AND METHOD FOR ISSUING JOB TO PERIPHERAL DEVICE

BACKGROUND OF THE INVENTION

1. Field of the Invention

The present invention relates to a technology for issuing a job to a peripheral device such as a printer, a scanner, a copying machine, a facsimile apparatus or an apparatus capable of performing the functions of these devices in composite manner.

2. Related Background Art

In a peripheral device such as a printer, the start of a job and the secrecy assurance of the output result are conventionally controlled by designating a mode in which, after a job is assigned to the peripheral device, the job processing is started in response to a separate start command, or a mode in which, after a job is assigned to the peripheral device, the job processing is started in response to a separate start command including a password.

For example, there is already known an apparatus which, after receiving a password together with print data transmitted from a host apparatus, receives a password entered by the user through the operation panel and starts printing only in case the entered password matches the transmitted password, thereby achieving printing with ensured security.

The aforementioned transmission of the job with password is made possible because a driver software (for controlling the peripheral device), installed in the information processing apparatus (host computer) supports a peripheral device capable of processing a job with password and recognizes in advance, for the above-mentioned device, that a command for processing a job with password can be designated.

Consequently, a driver software not having information on the peripheral devices capable of processing the job with password has been incapable, in transmitting a job to such peripheral device, of providing the user whether such peripheral device has a secret printing function.

Also in a peripheral device such as a printer, the kind of the job assigned thereto can be conventionally designated by designating such mode in a job assignment start command. A job can be assigned with a desired mode in such job assignment start command, because the driver software in advance recognizes and displays the modes processable by such peripheral device.

The recognition by the driver software of the modes processable by the peripheral device is usually achieved, at the installation of such driver software in the external apparatus, by the storage therein of the modes processable by the peripheral device.

However, in recent years, the peripheral device is improved rapidly and has various additional functions. When the peripheral device such additional functions is connected to a network, the user is required to store the functions (modes) processable by such peripheral device in an external apparatus on the network. Such operation is however cumbersome and an additional memory is required in the external apparatus, thereby resulting in an increased cost.

SUMMARY OF THE INVENTION

In consideration of the foregoing, an object of the present invention is, even in case the driver software installed in an information processing apparatus does not recognize in advance the start modes (various patterns for starting the job processing being collectively called start modes) owned by a peripheral device to which the job is to be assigned, to cause the user of the information processing apparatus to recognize, from such peripheral device, the start modes available therein and to enable the user to select a desired start mode among such available start modes.

Another object of the present invention is to enable the information processing apparatus to designate, by a control command, the start mode selected by the user, such as a mode for starting the job processing after a start command (start command awaiting mode) or a mode for starting the job processing after a password entry (start command with password awaiting mode), to the peripheral device, thereby arbitrarily controlling the start timing or the start condition for job output according to the need of the user.

Still another object of the present invention is, even in case the driver software installed in the information processing apparatus does not recognize in advance the job assignment modes (various types of the assigned job being collectively called job assignment modes) owned by the peripheral device to which the job is to be assigned, to cause the user of the information processing apparatus to recognize, from such peripheral device, the job assignment modes available therein and to enable the user to select a desired job assignment mode among such available job assignment modes.

BRIEF DESCRIPTION OF THE DRAWINGS

FIG. 6 is a view showing an example of "a list of attributes supported by job" which is a list of attributes of the job held by the peripheral device;

FIG. 7 is a view showing an example of "a list of attributes designatable for the job processing start mode" held by the peripheral device;

FIG. 17 is a view showing a memory map of a memory medium storing various data processing programs readable by a print system in which a print control apparatus is adaptable;

FIG. 18 is a view showing an example of "a list of attributes designatable as the job processing start mode" held by the peripheral device;

FIG. 26 is a view showing an example of "modes (mixed) designatable as job assignment start command" attribute held by the peripheral device;

FIG. 27 is a view showing "list of designatable file storage locations" attribute held by the peripheral device;

FIG. 28 is a view showing "list of designatable default file storage locations" attribute held by the peripheral device;

FIG. 34 is a view showing a list of attributes of a job held by the peripheral device;

FIG. 35 is a view showing "list of attributes designatable as a job deletion mode", held by the peripheral device;

FIG. 36 is a view showing a setting image for "job deletion mode" attribute;

FIG. 37 is a view showing a setting image displayed in case an absolute time is designated in the setting image for the "job deletion mode" attribute;

DETAILED DESCRIPTION OF THE PREFERRED EMBODIMENTS

Figure 1:
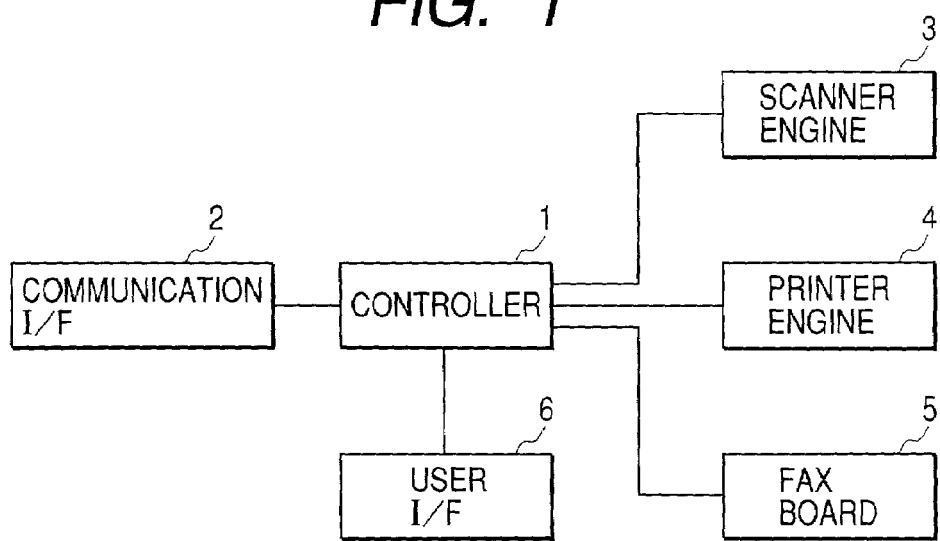
FIG. 1 is a block diagram showing an example of a peripheral device.

FIG. 1 is a block diagram showing an example of a peripheral device constituting an embodiment of the present invention, the peripheral device having a compound image processing function capable of processing a job by an image input function, a print function and a facsimile transmission/reception function.

Figure 2:
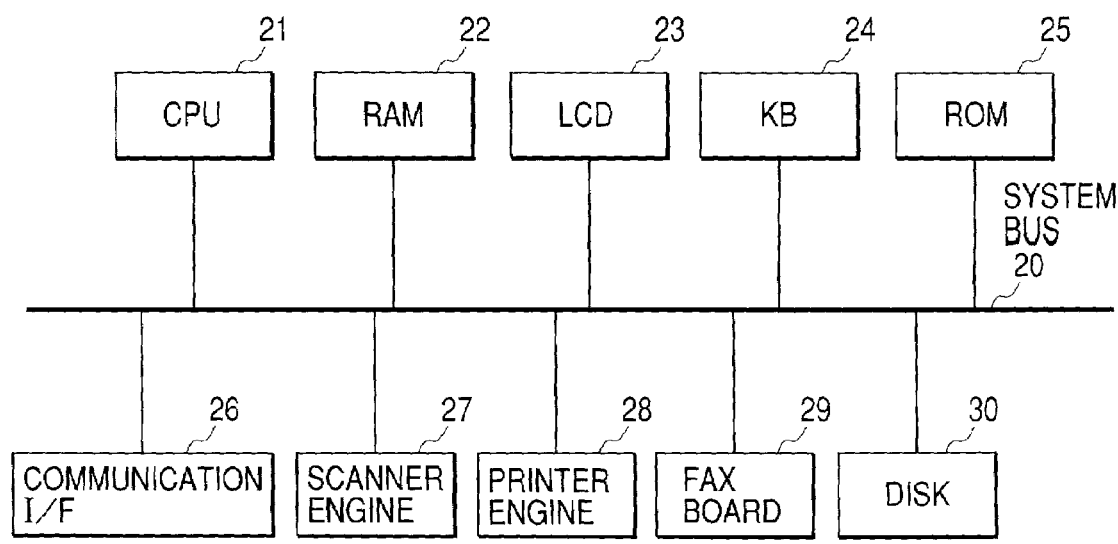
FIG. 2 is a block diagram showing the detailed configuration of hardware resources for a controller.

Referring to FIG. 1, a controller 1 for controlling peripheral devices is provided with hardware resources as shown in FIG. 2 and as will be explained later. A communication interface 2 for enabling communication of the controller 1 with the exterior of the peripheral device is composed for example of an ethernet interface, a IEEE1284 interface or another communication interface.

A scanner engine 3 is controlled by the controller 1. A printer engine 4 is controlled by the controller 1. The printer engine 4 is composed for example of a laser beam printer, an ink jet printer or another printer engine.

A facsimile board 5 for realizing facsimile function, such as communication control at the image transmission/reception, is controlled by the controller 1. A user interface 6 composed of an LCD display and a keyboard displays information from the controller 1 and transmits the instruction from the user to the controller 1.

In the peripheral device of the above-described configuration, a print job is processed by the controller 1 by selecting and controlling the printer engine 4. Also a copy job is processed by the controller 1 by selecting and controlling the printer engine 4 and the scanner engine 3. Also a facsimile reception job and a facsimile transmission job are processed by the controller 1 by selecting and controlling the printer engine 4, the scanner engine 3 and the facsimile board 5.

FIG. 2 is a block diagram showing the detailed configuration of the hardware resources in the controller 1 shown in FIG. 1.

As shown in FIG. 2, the controller 1 is provided with a CPU 21, a RAM 22, an LCD 23, a keyboard 24, a ROM 25, a communication interface 26, a scanner engine 27, a printer engine 28, a facsimile board 29, and a DISK 30, which are mutually connected through a system bus 20. A program controlling the controller 1 shown in FIG. 1 is stored in the ROM 25 or the DISK 30, and is loaded in the RAM 22 when required and is executed by the CPU 21.

The ROM 25 and the DISK 30 also store, in addition to the control program attribute information indicating function and status of the peripheral device and of the job to be processed therein, and job data to be outputted.

The CPU 21 executes information display through the LCD 23 and receives user instructions through the keyboard 24. The CPU 21 also executes communication with the exterior through the communication interface 26.

In the peripheral device of the present embodiment shown in FIG. 1, unless otherwise stated, the CPU 21 receives a user input through the keyboard 24 and the system bus 20 and executes processing by controlling the RAM 22, the LCD 23, the ROM 25, the communication interface 26, the scanner engine 27, the printer engine 28, the facsimile board 29 and the DISK 30.

Figure 3:
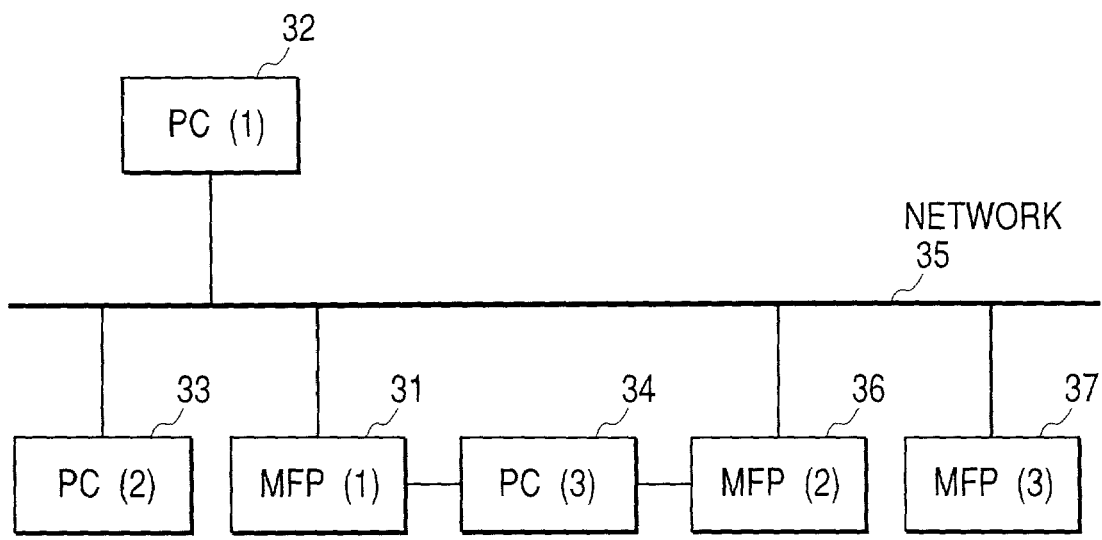
FIG. 3 is a block diagram showing an example of the configuration of a network system in which the peripheral device is adaptable.

FIG. 3 is a block diagram showing an example of the configuration of a network system in which the peripheral device shown in FIG. 1 is applicable.

Figure 4:
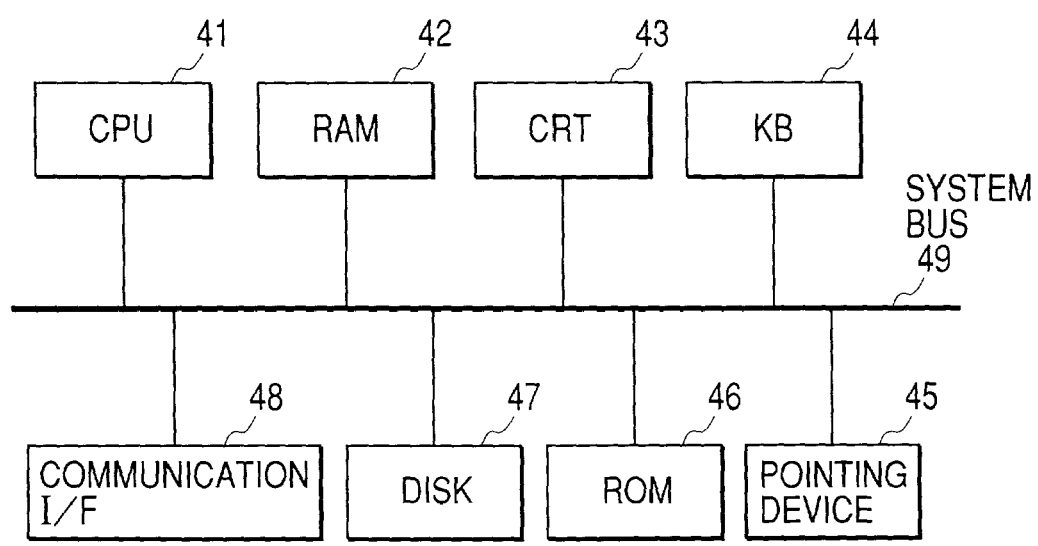
FIG. 4 is a block diagram showing the configuration of an information processing apparatus.

In FIG. 3, an MFP (multi function peripheral) 31, an MFP 36 and an MFP 37 are peripheral devices shown in FIG. 1. Each of a PC (personal computer) 32, a PC 33 and a PC 34 is provided with the hardware resources as shown in FIG. 4, and they are connected with the MFP 31 through a network 35. A work station or another peripheral device or another device may also be connected with the MFP 31 through the network 35.

A driver software, executed by the PC 32, 33 or 34, can request processing of a job such as printing, scanning, copying or facsimile transmission/reception to the MFP 31 through the network 35, or inquire the attribute information of the MFP 31.

FIG. 4 is a block diagram showing the configuration of an information processing apparatus constituting an embodiment of the present invention, corresponding to an example of the configuration of the hardware resources in the PC's 32 to 34.

As shown in FIG. 4, each of the PC's 32 to 34 is provided with a CPU 41, a RAM 42, a CRT 43, a keyboard 44, a pointing device 45, a ROM 46, a DISK 47 and a communication interface 48, which are mutually connected through a system bus 49.

Programs controlling the PC's 32 to 34 are stored in the ROM 46 or the DISK 47, and are loaded in the RAM 42 when required and are executed by the CPU 41. The CPU 41 executes information display through the CRT 43 and receives user instructions through the keyboard 44 and the pointing device 45. The CPU 41 also executes communication with the exterior through the communication interface 48.

In the PC of the present embodiment shown in FIG. 4, unless otherwise stated, the CPU 41 receives a user input from the keyboard 44 and the pointing device 45 through the system bus 49 and executes processing by controlling the RAM 42, the CRT 43, the ROM 46, the DISK 47 and the communication interface 48.

The user instruction to the peripheral device shown in FIG. 1 or the information display to the user may be realized through a local user interface 6 shown in FIG. 1, or through a client device connected by the network 35, such as the PC 32, 33 or 34 shown in FIG. 3.

Figure 5:
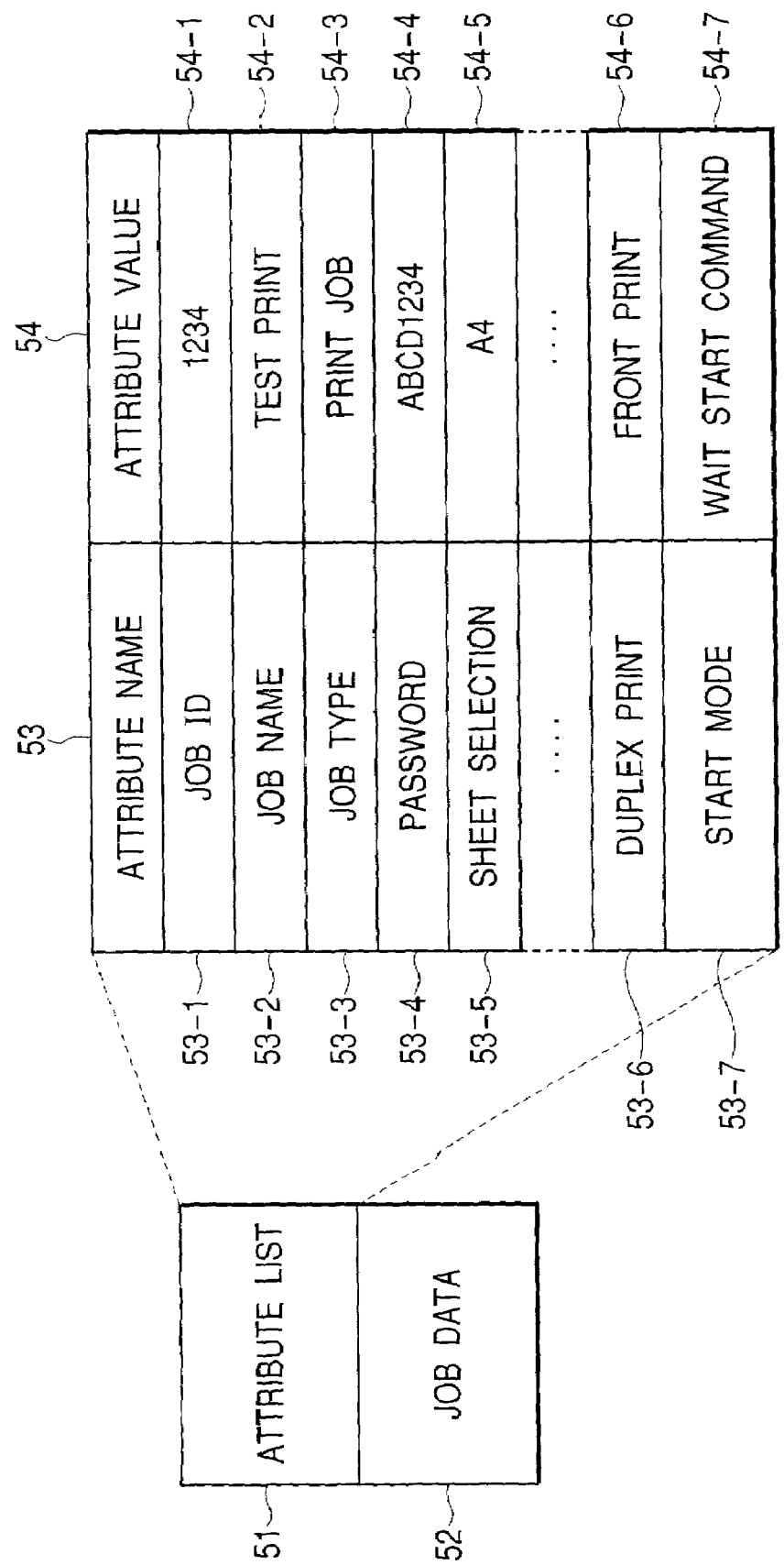
FIG. 5 is a view showing an example of the configuration of a job processed by the peripheral device.

FIG. 5 is a view showing an example of the configuration of a job to be processed by the peripheral device shown in FIG. 1.

In the present embodiment, the job processed by the peripheral device shown in FIG. 1 is composed of an attribute list 51 representing the function and state of the job, and job data 52 indicating the data to be processed in the job.

Referring to FIG. 5, job data 52 indicate data to be processed, such as image data. The job data 52 may be absent in certain types of the job.

The attribute list 51 is composed of an attribute name 53 and an attribute value 54. Attribute values 54-1 to 54-7 are respectively set for an attribute job identifier 53-1, a job name 53-2, a job type 53-3, a password 53-4, a sheet selection 53-5, a duplex printing 53-6 and a start mode 53-7. Thus the attribute list 51 indicates the function and state of the job assigned by the driver software. In the present embodiment, the attribute name 53 constituting a column of the attribute list 51 may be replaced by designated attribute identifiers. The attributes listed in the attribute list 51 are same as those in an "attribute list supported by job" as shown in FIG. 6.

An attribute name 53-1 indicates an identifier of the assigned job, and its attribute value 54-1 indicates that the "job identifier" is "1234". Also an attribute name 53-2 indicates the name of the assigned job, and its attribute value 54-2 indicates that the "job name" is "test print".

An attribute name 53-3 indicates the type of the assigned job such as a print job or a copy job, and its attribute value 54-3 indicates that the "job type" is "print job".

Also an attribute name 53-4 indicates a job password requested at the start of the job processing, and its attribute value 54-4 indicates that the "job password" is "ABCD1234".

Also an attribute name 53-5 indicates the selection of sheet to be used in the assigned job, and its attribute value 54-5 indicates that the "sheet selection" is "A4".

Also an attribute name 53-6 indicates whether the printing in the assigned job is on the front surface only, on both surfaces or on the rear surface only, and its attribute value 54-6 indicates that the "print surface" is "front surface".

Also an attribute name 53-7 indicates a start mode representing the timing or condition of starting the processing of the job in the peripheral device.

In the present embodiment, the meanings of the aforementioned attributes, attribute names or attribute identifiers and attribute values are already known in the peripheral device shown in FIG. 1 and in the driver software.

FIG. 6 is a view showing an example of an "attribute list supported by the job", which is a list or the attributes of the job held by the peripheral device shown in FIG. 1. The list is stored in the ROM 25 or the DISK 30 shown in FIG. 2. However, the attributes contained in the "attribute list supported by the job" may be other than those shown in FIG. 6. The "attribute list supported by the job" shown in FIG. 6 show all the attributes held by the job processed by the peripheral device.

In the "attribute list supported by the job" of the present embodiment, the row is composed of an attribute name 61, whether setting is possible 62, whether change is possible 63, and whether acquiring is possible 64, while the column is composed of the attribute names 65-1 to 65-7. TRUE and FALSE respectively indicate possible and not possible.

As shown in FIG. 6, the "attribute list supported by the job" indicates, for each of the attribute names 65-1 to 65-7, whether the driver software can set the attribute value at the job assignment (whether setting is possible 62), whether the driver software can change the attribute value for the already assigned job (whether change is possible 63), and whether the driver software can acquire the attribute value for the assigned job (whether acquiring is possible 64), and TRUE and FALSE respectively indicate each is possible or not possible.

More specifically, an attribute name 65-1 indicates the support state of a "job ID" attribute, which cannot be set nor changed but can be acquired according to the contents 62, 63, 64.

An attribute name 65-2 indicates the support state of a "job name" attribute, which can be set, cannot be changed and can be acquired according to the contents 62, 63, 64.

An attribute name 65-3 indicates the support state of a "job type" attribute, which can be set, cannot be changed and can be acquired according to the contents 62, 63, 64.

An attribute name 65-4 indicates the support state of a "job password" attribute, which can be set, cannot be changed and cannot be acquired according to the contents 62, 63, 64.

An attribute name 65-5 indicates the support state of a "sheet selection" attribute, which can be set, cannot be changed and can be acquired according to the contents 62, 63, 64.

An attribute name 65-6 indicates the support state of a "duplex print" attribute, which can be set, changed and acquired according to the contents 62, 63, 64.

An attribute name 65-7 indicates the support state of a "start mode" attribute, which can be set, cannot be changed and can be acquired according to the contents 62, 63, 64.

Figure 8:
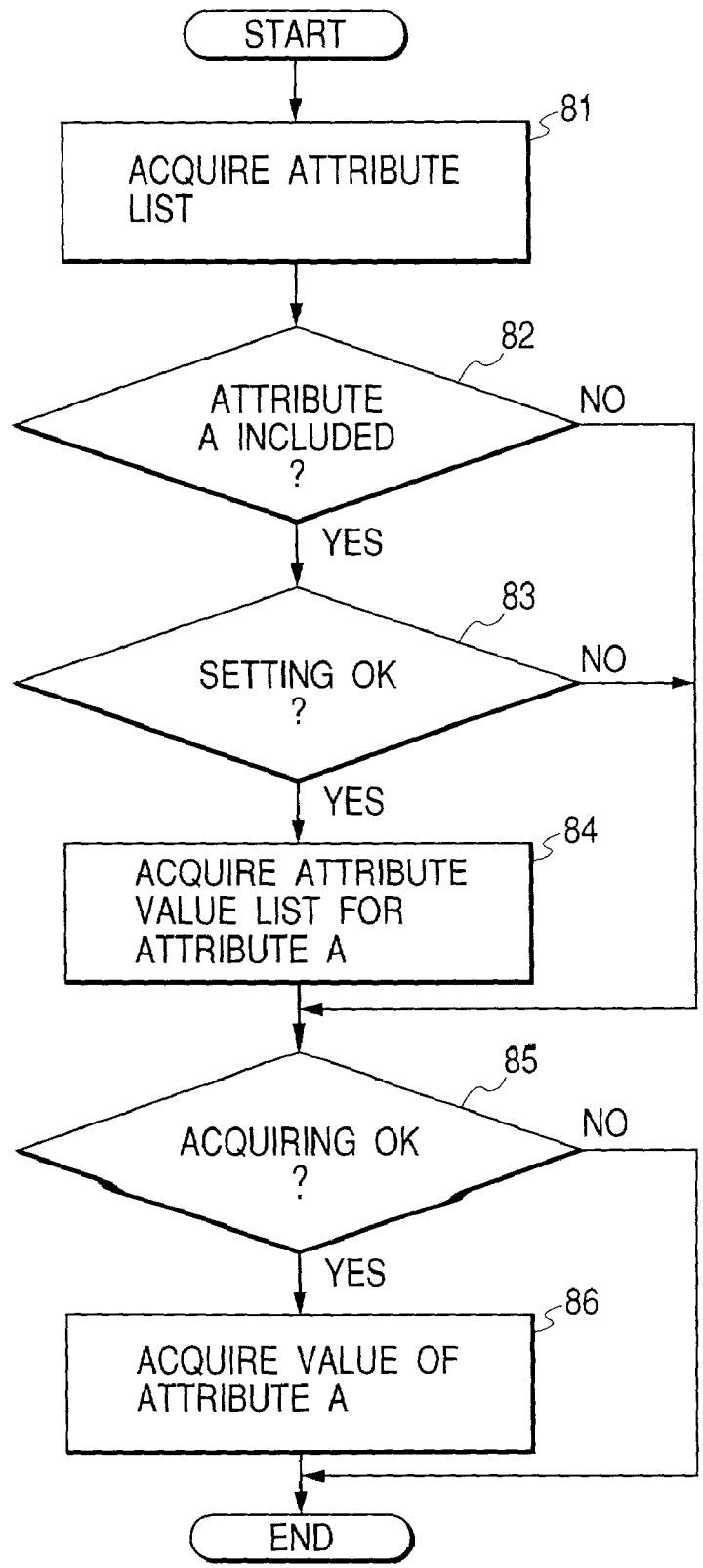
FIG. 8 is a flow chart showing an example of a first data processing sequence in the information processing apparatus.

FIG. 8 is a flow chart showing an example of a first data processing sequence in the information processing apparatus of the present invention, and indicating a process flow of the driver software inquiring the attribute information to the peripheral device shown in FIG. 1.

At a step 81 requests the acquisition of the "attribute list supported by the job" to the peripheral device and acquires such attribute list. Then a step 82 discriminates whether an attribute A required by the driver software is contained in the "attribute list supported by the job" acquired in the step 81, and, if such attribute A indicating a function is contained, the sequence proceeds to a step 83, but, if otherwise, the sequence proceeds to a step 85.

Then a step 83 discriminates, with respect to the attribute A contained in the acquired "attribute list supported by the job", whether the driver software can set the attribute A at the job assignment, and, if setting is possible, the sequence proceeds to a step 84, but, if otherwise, the sequence proceeds to a step 85.

Then a step 84 acquires a list of attribute values settable as the attribute A, from the peripheral device shown in FIG. 1. A step 85 discriminates whether the attribute A can be acquired by the driver software, and, if acquisition is possible, the sequence proceeds to a step 86, but, if otherwise, the sequence is terminated.

A step 86 requests the acquisition of the value of the attribute A to the peripheral device and acquires such value of the attribute A, whereupon the sequence is terminated.

Through the above-described process, the driver software can acquire information on the attributes held by the job to be processed by the peripheral device shown in FIG. 1 and information on the attribute values settable for each attribute. There can also be known the attribute value set for each attribute.

The process shown in FIG. 8 is executed when the user activates the driver software, wishing to execute printing. Based on the list of the attributes acquired in the step 82 and the list of the attribute values acquired in the step 84, the driver software constructs a setting image for enabling the user to set the attribute value for each attribute. Then, based on the attribute values set on the setting image, the driver software generates the attribute list 51 (FIG. 5). Also the job data 52 (FIG. 5) are prepared from the data outputted from an application program (for example a text processing program, a table calculation program or an image data generation program).

Figure 20:
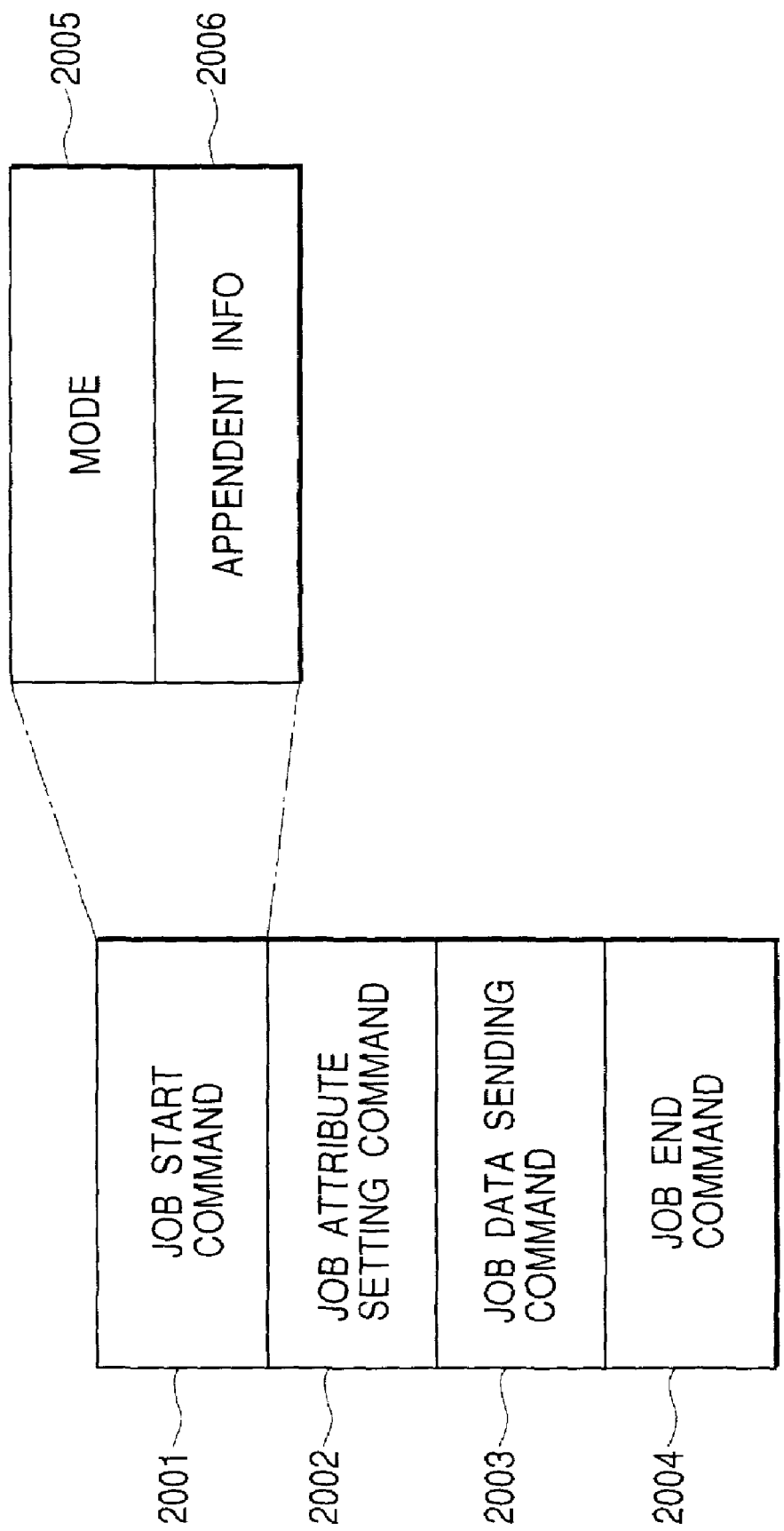
FIG. 20 is a view showing a group of commands for designating job processing.

FIG. 20 shows an example of a group of commands for designating job processing in issuing a job. In FIG. 20, the job configuration shown in FIG. 5 is represented by a command group. Such command group is generated by a process flow shown in FIG. 12 and is transmitted from a job issuing software (driver software) to the controller in the peripheral device.

The command group for designating the job process is composed of a job start command 2001, a job attribute setting command 2002, a job data sending command 2003 and a job end command (job end informing command) 2004. The job attribute setting command 2002 is used for designating the setting of an attribute value in the attribute list 51 in FIG. 5, and the job data sending command 2003 is used for transmitting the job data shown in FIG. 5.

The job start command 2001 is used for informing the controller of the start of job assignment, and contains a mode 2005 and additional information 2006 corresponding to the mode, as parameters. In response to the reception of the job start command 2001, the controller starts preparation for receiving and processing the job.

The job attribute setting command 2002 is used for setting the attributes representing the function and state of the job. The attributes include, for example, the job name, job type, data format, sheet selection etc., and this command allows to set plural attributes in succession.

The job data sending command 2003 is used for transmitting data to be subjected to job processing, such as image data. However, certain jobs do not require data to be processed, and this command may be dispensed with for such jobs.

The job end command (job end informing command) 2004 indicates that all the command group for designating the job process has been transmitted. A group of commands from the job start command 2001 to the job end command 2004 is interpreted as instructions relating to a job process.

Figure 12:
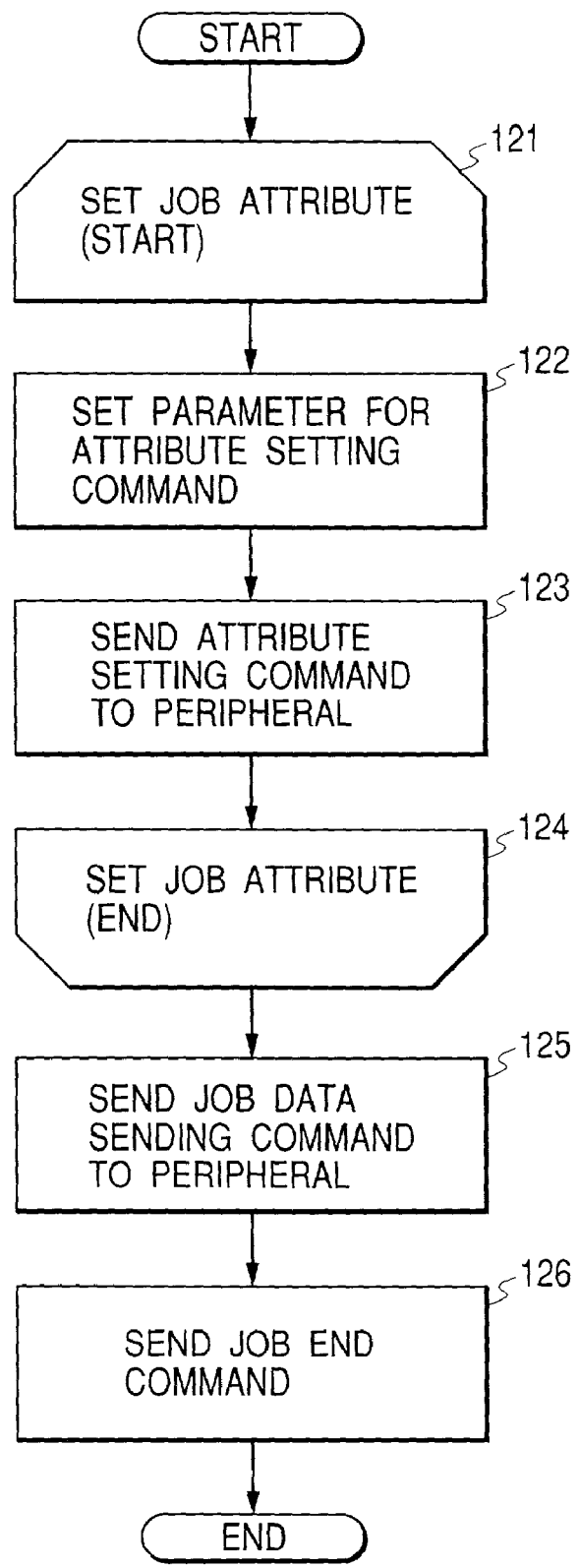
FIG. 12 is a flow chart showing an example of a third data processing sequence in the information processing apparatus.

FIG. 12 is a flow chart showing an example of a second data processing sequence in the information processing apparatus of the present invention, and corresponding to a process sequence in case the driver software, installed in the memory medium of the PC's 32 to 34 shown in FIG. 3, assigns a job to the peripheral device shown in FIG. 1, wherein 121 to 126 indicate process steps.

At first the driver software repeats steps 121 to 124 until the setting of the attributes required for the job process is completed.

In a step 122, the driver software sets, according to the job process, a parameter of the attribute setting command, in order to set the attributes of the job in the attribute list 51 shown in FIG. 5.

Among the job attributes, those that can be set by the driver software are listed in the "attribute list supported by the job" obtained by the process of the FIG. 8 and shown in FIG. 6, and are indicated therein by TRUE in the setting column 62.

Also the values settable for such attribute are shown in the "list of settable values" (FIG. 7) obtained by the process shown in FIG. 8.

Then a step 123 transmits the attribute setting command, prepared in the step 122, to the peripheral device to which the job is to be assigned.

The steps 122, 123 are executed for each attribute.

Then a step 125 transmits, by the job data sending command, the data subjected to the job process such as the image data prepared by an application to the peripheral device. Then a step 126 transmits the job end informing command indicating the end of transmission of the job assigning commands, thereby terminating the process.

The above-described job assignment process generates a job as shown in FIG. 5 in the peripheral device.

Figure 13:
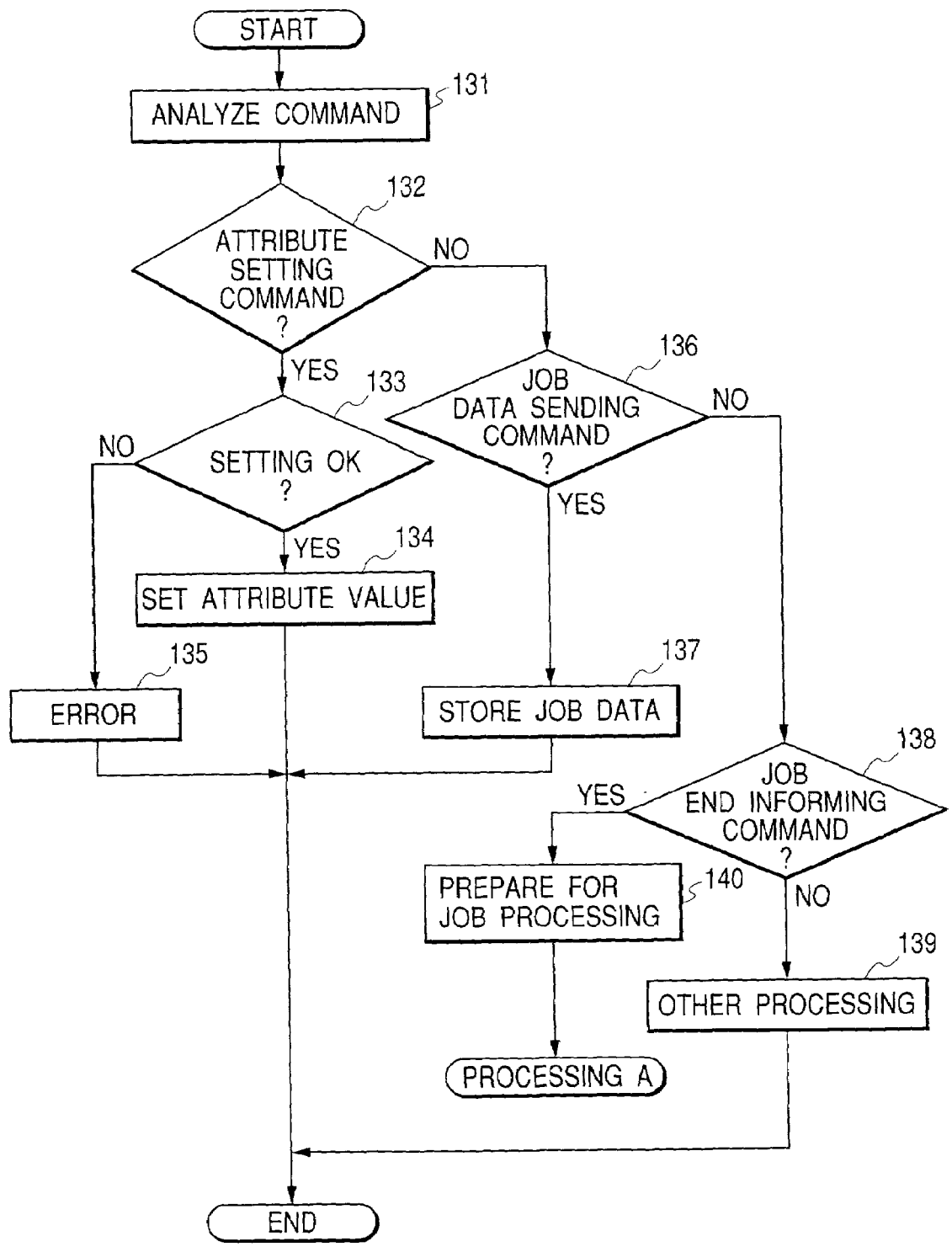
FIG. 13 is a flow chart showing an example of a first data processing sequence in the peripheral device.

FIG. 13 is a flow chart showing an example of a first data processing sequence in the peripheral device of the present invention, and corresponding to a process sequence to be executed by the peripheral device shown in FIG. 1 in response to the reception of a job assignment command from the driver software installed in the memory medium of the PC's 32 to 34 shown in FIG. 3, wherein 131 to 140 indicate process steps.

At first in a step 131, the peripheral device shown in FIG. 1 analyzes the command received from the driver software and the parameters thereof and stores the results.

Then a step 132 discriminates, based on the result of analysis of the step 131, whether the received command is an attribute setting command, and, if so, the sequence proceeds to a step 133, but, if otherwise, the sequence proceeds to a step 136.

Then a step 133 checks the "attribute list supported by the job" shown in FIG. 6 and the result of analysis of the step 131 and discriminates whether the attribute designated by the received attribute setting command is settable, and, if settable, the sequence proceeds to a step 134, but, if otherwise, the sequence proceeds to a step 135.

Then a step 134 sets the designated value in the designated attribute according to the result of analysis obtained in the step 131, whereupon the sequence is terminated.

On the other hand, if the step 133 identifies that the designated attribute is not settable, a step 135 informs the driver software that the attribute designated by the received attribute setting command is not settable and that the attribute setting has not been possible, whereupon the sequence is terminated.

On the other hand, in case the step 132 identifies that the received command is not an attribute setting command, a step 136 discriminates whether the received command is a job data sending command based on the result of analysis obtained in the step 131, and, in case of a job data sending command, the sequence proceeds to a step 137, but, if otherwise, the sequence proceeds to a step 138.

Then a step 137 stores the job data, received in succession to the command, in the RAM 22 or the DISK 30 shown in FIG. 2, whereupon the sequence is terminated.

On the other hand, if the step 136 identifies that the received command is not a job data sending command, a step 138 discriminates, based on the result of analysis obtained in the step 131, whether the received command is a job end informing command, and, if so, the sequence proceeds to a step 140, but, if otherwise, the sequence proceeds to a step 139.

Figure 15:
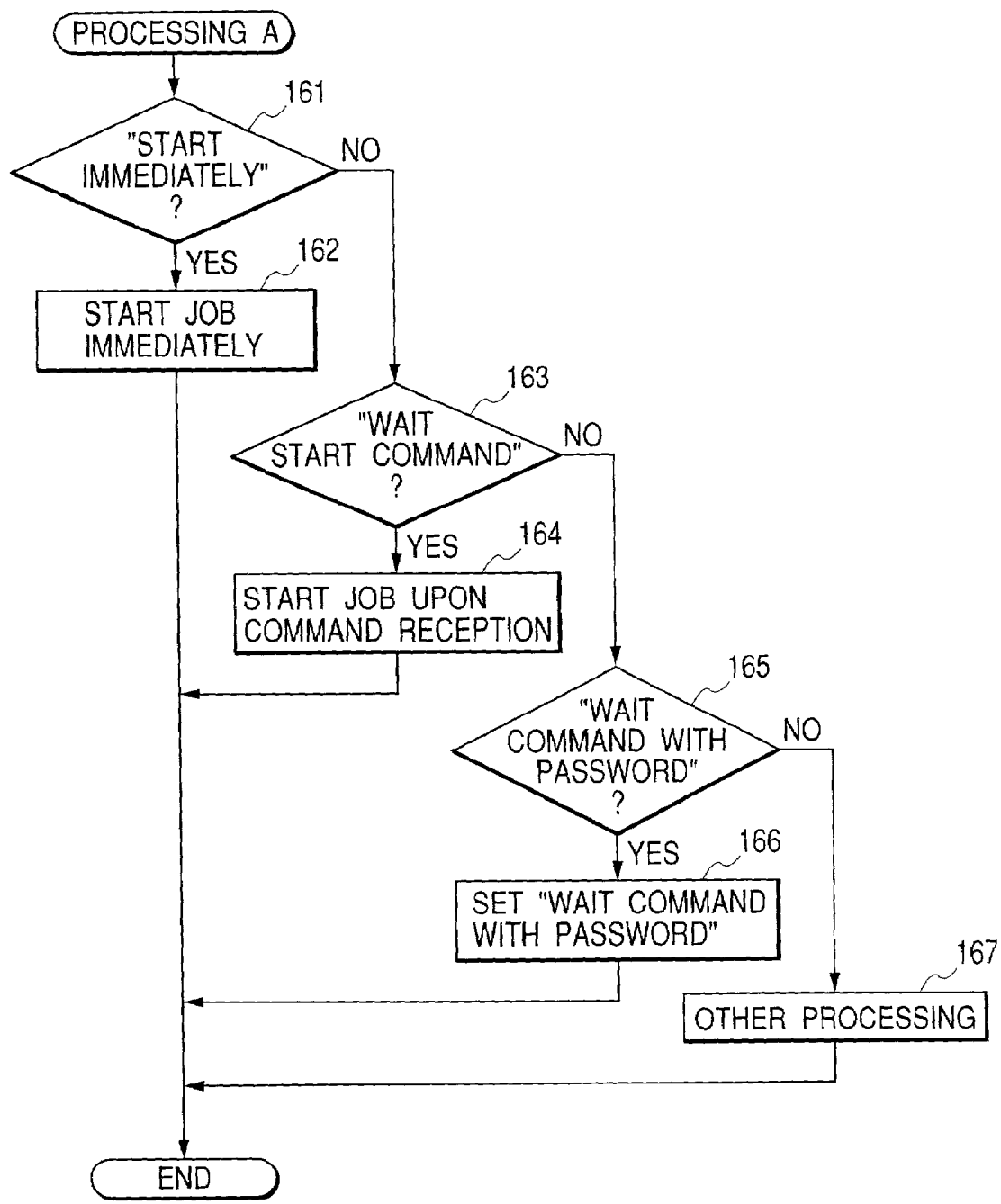
FIG. 15 is a flow chart showing an example of a third data processing sequence in the peripheral device.
Figure 39:
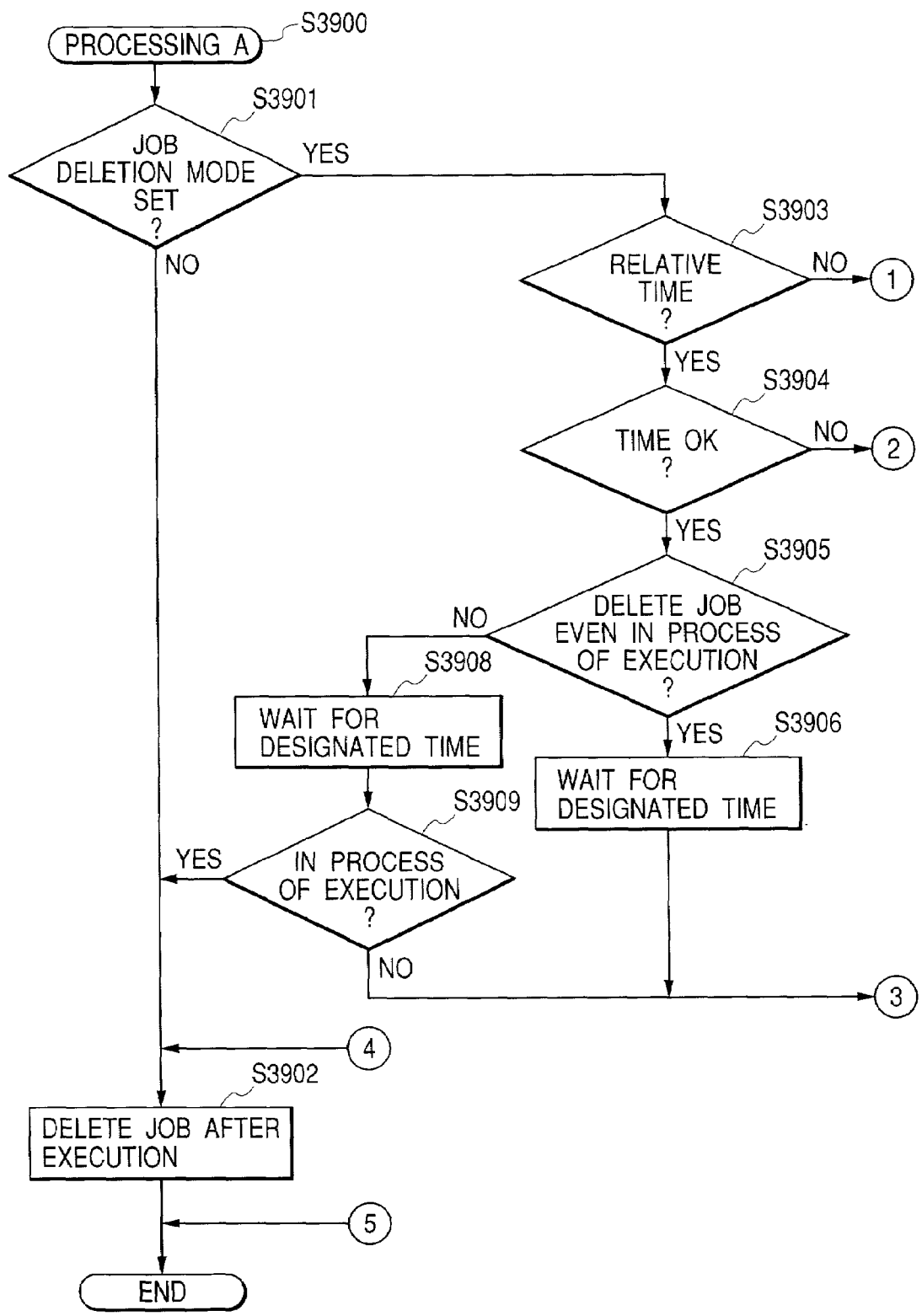
FIGS. 39 and 40 are flow charts showing a process for the job deletion mode.

Then a step 140 executes preparation for starting the job process, and the sequence then proceeds to processes shown in FIGS. 15 and 39 for discriminating the start condition of the job process.

On the other hand, if the step 138 identifies that the received command is not a job end informing command, a step 139 identifies that the received command is another command and executes a process corresponding to such another command, whereupon the sequence is terminated.

Figure 14:
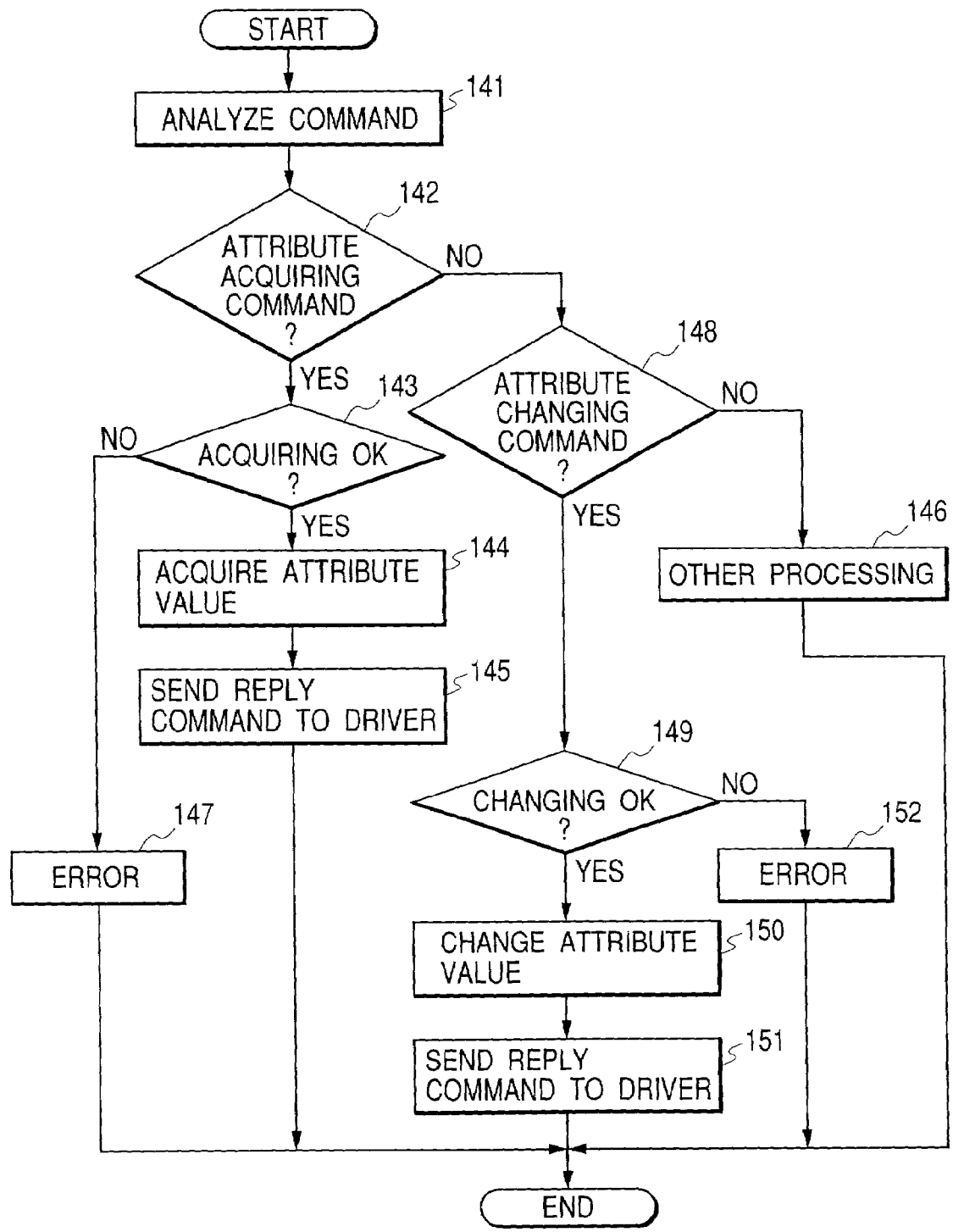
FIG. 14 is a flow chart showing an example of a second data processing sequence in the peripheral device.

FIG. 14 is a flow chart showing an example of a second data processing sequence in the peripheral device of the present invention, and corresponding to a process sequence to be executed by the peripheral device shown in FIG. 1 in response to the reception of an access command to the attributes of the job from the driver software installed in the memory medium of the PC's 32 to 34 shown in FIG. 3, wherein 141 to 151 indicate process steps.

At first a step 141 analyzes the received command and the parameters thereof. Then a step 142 discriminates, based on the result of analysis of the step 141, whether the received command is an attribute acquiring command, and, if so, the sequence proceeds to a step 143, but, if otherwise, the sequence proceeds to a step 148.

Then a step 143 discriminates whether the attribute designated by the attribute acquiring command is acquirable, and, if acquirable, the sequence proceeds to a step 144, but, if otherwise, the sequence proceeds to a step 147.

Then a step 144 acquires the value of such attribute held in the peripheral device, and a step 145 sets the acquired attribute value as a parameter of a response command and transmits a response command, to the attribute acquiring command, to the river software whereupon the sequence is terminated.

On the other hand, if the step 143 identifies that the attribute is not acquirable, a step 147 executes a process of informing the driver software that the acquisition of the attribute has failed (an error response command transmission process), whereupon the sequence is terminated.

On the other hand, if the step 142 identifies that the received command is not an attribute acquiring command, a step 148 discriminates, based on the result of analysis in the step 141, whether the received command is an attribute value changing command (attribute changing command), and, if so, the sequence proceeds to a step 149, but, if otherwise, the sequence proceeds to a step 146.

Then a step 149 discriminates whether the attribute designated by the attribute value changing command is changeable, and, if changeable, the sequence proceeds to a step 150, but, if otherwise, the sequence proceeds to a step 152.

A step 150 changes the attribute value of the designated attribute to a designated attribute value according to the designated command parameter, and a step 151 executes a process of informing the driver software that the attribute value has been successfully changed, whereupon the sequence is terminated.

On the other hand, if the step 149 identifies that the attribute value is not changeable, a step 152 executes a process of informing the driver software that the change of the attribute value has failed (an error response command transmission process), whereupon the sequence is terminated.

On the other hand, if the step 148 identifies that the received command is not an attribute changing command, a step 146 identifies that the received command is another command and executes a process corresponding to such another command, whereupon the sequence is terminated.

<Start Mode>

FIG. 7 is a view showing an example of a "list of attribute values designatable for the start mode of job process" held by the peripheral device shown in FIG. 1, and stored in the ROM 25 or the DISK 30 shown in FIG. 2.

The "list of attribute values designatable for the start mode of job process" shown in FIG. 7 lists the attribute values which can be designated by the driver software as the value of a "job process start mode" attribute held by the job to be processed by the peripheral device.

However, the attribute values listed in the "list of attribute values designatable for the start mode of job process" can be other than those listed in FIG. 7. FIG. 7 lists five attribute values, namely "designated by absolute time", "designate by relative time", "wait start command with password", "wait start command" and "start immediately", but the attribute values to be listed vary according to the type of the peripheral device or the optional device thereof. For example, the attribute value can be "start immediately" only for a peripheral device A and can be "wait start command with password", "wait start command" and "start immediately" for another peripheral device B.

In the present embodiment, it is assumed that the "job process start mode" attributes are listed in the "list of attributes supported by the job" shown in FIG. 6 and held by the peripheral device shown in FIG. 1, and that other attributes required according to the set values of the "job process start mode" attributes are also listed in the "list of attributes supported by the job" shown in FIG. 6. For example, a "password" attribute is required in response to the setting of "wait start command with password" in the "job process start mode" attribute.

Also the "job process start mode" attribute indicates the setting of the start condition for the job process assigned by the driver software to the peripheral device shown in FIG. 1, and the start of the assigned job process can be controlled by setting such "job process start mode" attribute.

In FIG. 7, an attribute value "designated by absolute time" 301 indicates that the start time is designated by an absolute time and that the job process is started when the start time is reached. The attribute value also includes the start time to be designated.

Also an attribute value "designate by relative time" 302 indicates that the start time is designated by a relative time and that the job process is started when the start time is reached. The attribute value also includes the start time to be designated.

An attribute value "wait start command with password" 303 indicates that a start command and a password input are required and that the job process is started only in case the start command is given with the proper password. In such start command, the password to be verified is designated by the "job password" attribute. The start command and the password are to be entered by a command from the PC 32 (or 33 or 34) or from the keyboard 24.

An attribute value "wait start command" 304 indicates that the job process is started when the start command is given by the user. The start command is to be entered from the PC 32 (or 33 or 34) or from the keyboard 24.

An attribute value "start immediately" 305 indicates that the job process is started immediately with the job assignment. Thus the peripheral devices starts the job process without awaiting the input of the start command or the lapse of the predetermined time.

Figure 9:
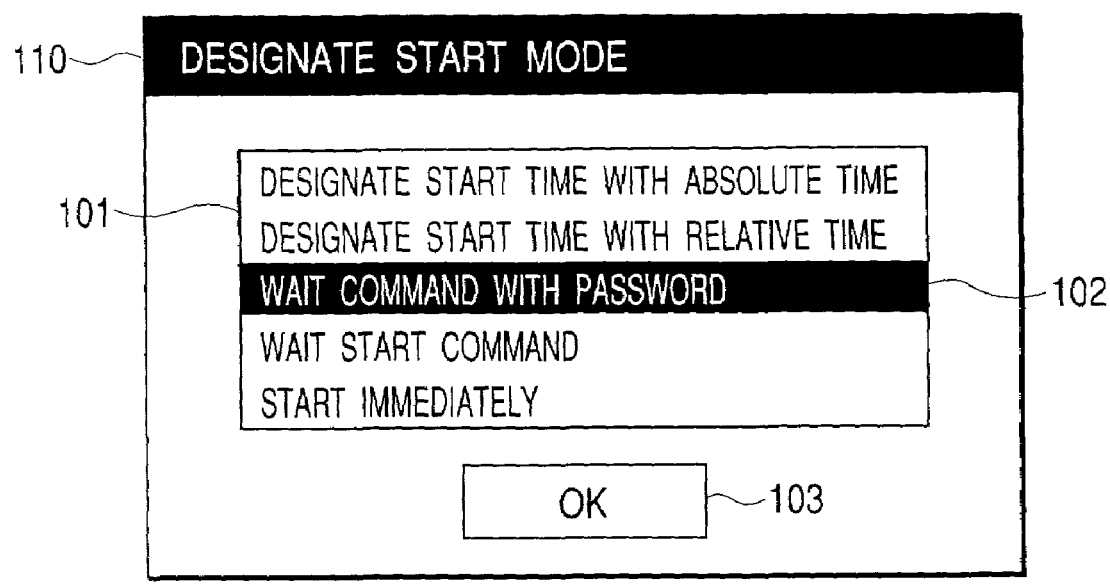
FIG. 9 is a view showing an example of an image for setting the "job processing start mode" attribute, displayed on a CRT.

FIG. 9 shows a setting image for the "job process start mode" attribute, displayed on the CRT 43 shown in FIG. 4.

The image shown in FIG. 9 is used for setting the "job process start mode" by the user in assigning the job to the peripheral device, and is displayed on the CRT of the PC 32 (or 33 or 34) shown in FIG. 3.

It is assumed, in the PC 32 (or 33 or 34) shown in FIG. 3, that the driver software, prior to the generation of the setting image shown in FIG. 9, acquires a list of the values settable as the "job process start mode" attribute by the attribute information acquiring flow shown in FIG. 8.

More specifically, a step 82 discriminates whether the "job process start mode" attribute is included in the attribute list, and, if included, a step 83 discriminates whether the "job process start mode" attribute is settable. If settable, a step 84 acquires a list of the attribute values settable in the "job process start mode" from the peripheral device.

In FIG. 9, a title 110 of the setting image briefly explains such image and indicates that such setting image is to be used for designating the value of the "job process start mode" attribute.

A list box 101 displays a list of the attribute values obtained by the attribute information acquiring flow shown in FIG. 8 and settable in the "job process start mode" attribute. The attribute values listed in the list box 101 correspond one to one to the list of values settable in the "job process start mode" attribute shown in FIG. 3.

The user selects a desired set value from the list box 101, utilizing the keyboard 44 or the pointing device 45 in the PC 32, 33 or 34.

A reversal display 102 indicates the currently selected value of the "job process start mode" attribute. In the example shown in FIG. 9, there is selected "wait start command with password". An OK button 103 is used for determining the attribute value of the attribute of the assigned job as the value indicated by the reversal display 102. When the OK button 103 is depressed, the selected attribute value is stored in the attribute value 54-7 (FIG. 5).

Figure 10:
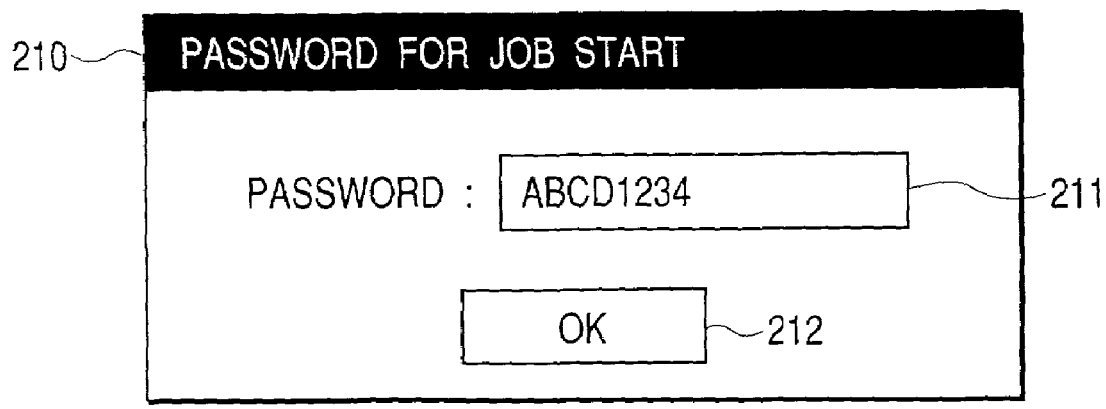
FIG. 10 is a view showing an example of an image for setting a start password for the job processing, displayed on a CRT.

FIG. 10 shows a setting image for a job process start password displayed on the CRT 43 shown in FIG. 4. This image is used by the user for setting the password in case the user sets "wait start command with password" in the setting image for the "job process start mode" attribute shown in FIG. 9, and is displayed on the CRT of the PC 32 (or 33 or 34) shown in FIG. 3. This password corresponds to the password entered in the user interface 6 of the peripheral device in association with the job process start command.

It is assumed that the user interface 6, prior to the generation of the image shown in FIG. 10, acquires the maximum value of the length of the password usable in the "wait start command with password", by the attribute information acquiring flow shown in FIG. 8.

In FIG. 10, a title 210 of the setting image briefly explains such image and indicates that such setting image is to be used for setting the password to be entered in association with the job process start command. In an edit box 211, there is set a password to be entered in the user interface 6 of the peripheral device. An OK button 212 is used for determining the password to be referred to in the process start command for the job to be assigned at the value entered into the edit box 211. The driver software compares the length of the determined password with the "maximum length of the password usable in the "wait start command with password" mode", and, if the maximum value is exceeded, displays a warning and requests the input of the password again.

Figure 11:
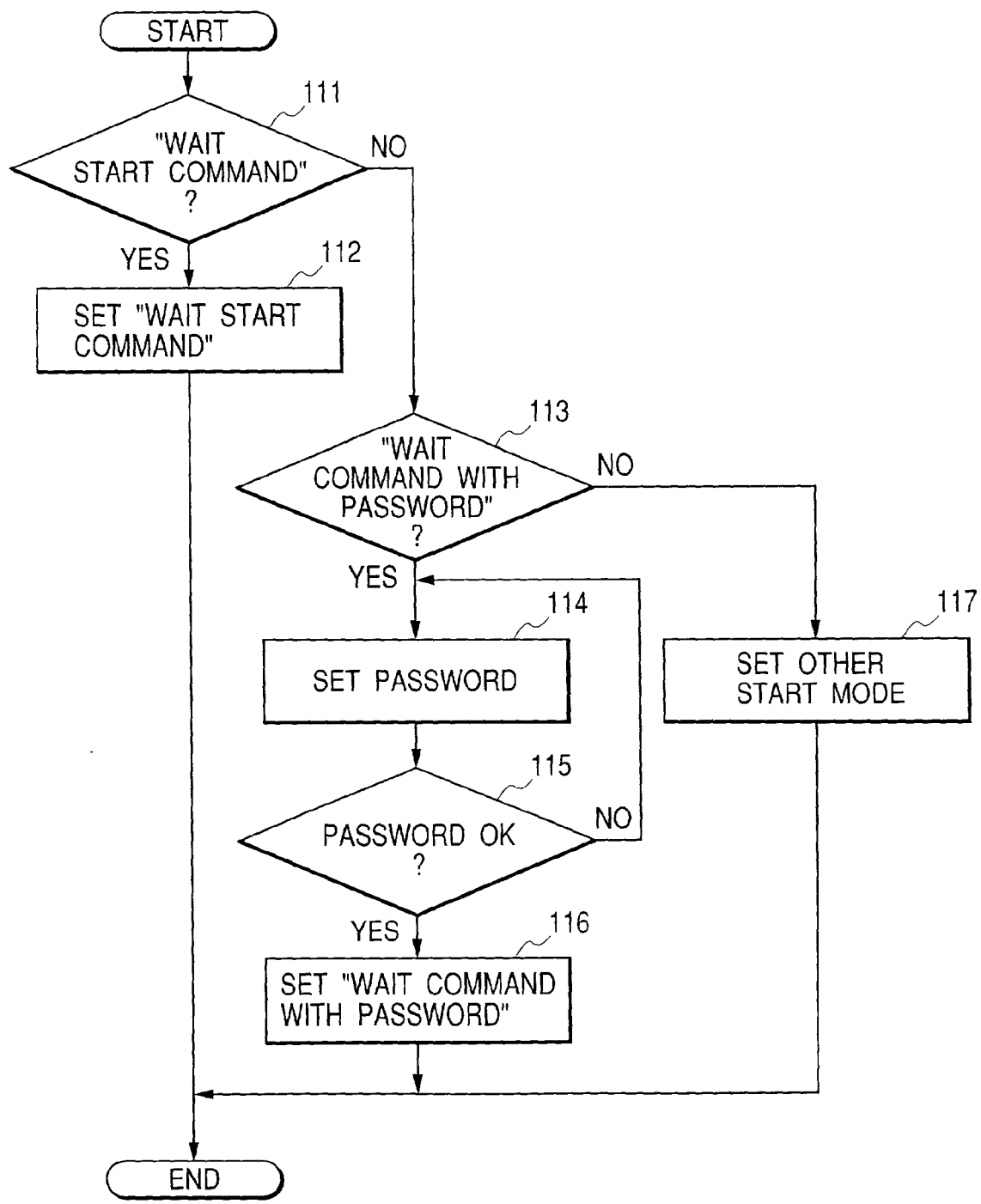
FIG. 11 is a flow chart showing an example of a second data processing sequence in the information processing apparatus.

FIG. 11 is a flow chart showing an example of a third data processing sequence in the information processing apparatus of the present invention, and corresponding to a process sequence for setting the "job process start mode" attribute in the job assignment to the peripheral device shown in FIG. 1 by the driver software installed in the memory medium of the PC's 32 to 34 shown in FIG. 3, wherein 111 to 117 indicate process steps.

At first a step 111 discriminates whether the "wait start command" is selected and determined in the "job process start mode" attribute setting image shown in FIG. 9, and, if selected and determined, the sequence proceeds to a step 112, but, if otherwise, the sequence proceeds to a step 113. If the "wait start command" mode cannot be set, namely if the attribute list shown in FIG. 7 does not include the "wait start command" mode, the sequence directly proceeds to a step 113.

Then a step 112 sets the "wait start command" in the "job process start mode" of the job to be assigned, whereupon the sequence is terminated.

On the other hand, if the step 111 identifies that the "wait start command" is not selected, a step 113 discriminates whether the "wait start command with password" is selected and determined in the setting image for the "job process start mode" shown in FIG. 9, and, if selected and determined, the sequence proceeds to a step 114, but, if otherwise, the sequence proceeds to a step 117. If the "wait start command with password" mode cannot be set, namely if the attribute list shown in FIG. 7 does not include the "wait start command with password" mode, the sequence directly proceeds to a step 113.

Then a step 114 displays the setting image for the "job process start password" shown in FIG. 10 and causes the setting therein of the password entered in association with the start command by the user interface 6 of the peripheral device after the job assignment. Then a step 115 compares the length of the password set in the step 114 with the "maximum length of the password usable in the "wait start command with password" mode" acquired in advance, and discriminates whether the length of the password entered in the step 114 exceeds the designatable maximum value. If the maximum value is not exceeded, the sequence proceeds to a step 116, but, if otherwise, the sequence proceeds to a step 114.

Then a step 116 sets the "wait command with password" as the "job process start mode", and also sets the password entered in the step 114 as the password associated with the "wait command with password".

On the other hand, if the step 113 does not select the "wait start command with password", another mode is selected and determined as the "job process start mode" so that a step 117 sets such another mode as the "job process start mode" and executes a process required for such mode, whereupon the sequence is terminated.

More specifically, the step 117 discriminates whether the "start immediately" is selected and determined in the setting image shown in FIG. 9, and, if selected and determined, sets the "wait start command" for the "job process start mode" for the job to be assigned. It also discriminates whether the "designate by absolute time" is selected and determined, and, if selected and determined, it displays a setting image for designating the absolute time and sets the "designate by absolute time" for the "job process start mode". It also discriminates whether the "designate by relative time" is selected and determined, and, if selected and determined, it displays a setting image for designating the relative time and sets the "designate by relative time" for the "job process start mode".

FIG. 15 is a flow chart showing an example of a third data processing sequence in the peripheral device of the present invention, and corresponding to a process sequence for processing the job assigned by the driver software installed in the memory medium of the PC's 32 to 34 shown in FIG. 3, wherein 161 to 167 indicate process steps which are to be executed in continuation to the step 140 shown in FIG. 13.

At first a step 161 discriminates whether the value of the "job process start mode" attribute is "start immediately", and, if so, the sequence proceeds to a step 162, but, if otherwise, the sequence proceeds to a step 163.

Then a step 162 starts the job process immediately and terminates the process. If a job under current processing is already present, the assigned job is connected to the end of the queue of the jobs waiting for processing. The assigned job is started immediately when the assigned job comes to the turn.

On the other hand, if the step 161 identifies that the value is not "start immediately", a step 163 discriminates whether the value of the "job process start mode" attribute is "wait start command" and, if so, the sequence proceeds to a step 164, but, if otherwise, the sequence proceeds to a step 165.

Then a step 164 holds the job and waits until a start command by the user, and starts the job process in response to the start command whereupon the process is terminated.

On the other hand, if the step 163 identifies that the value is not "wait start command", a step 165 discriminates whether the value of the "job process start mode" attribute is "wait start command with password" and, if so, the sequence proceeds to a step 166, but, if otherwise, the sequence proceeds to a step 167.

Then a step 166 executes the process of the "wait command with password" mode to be explained later in FIG. 16, whereupon the process is terminated.

On the other hand, if the step 165 identifies that the value is not "wait start command with password", a step 167 executes a process corresponding to the value of another "job process start mode", whereupon the process is terminated.

Figure 16:
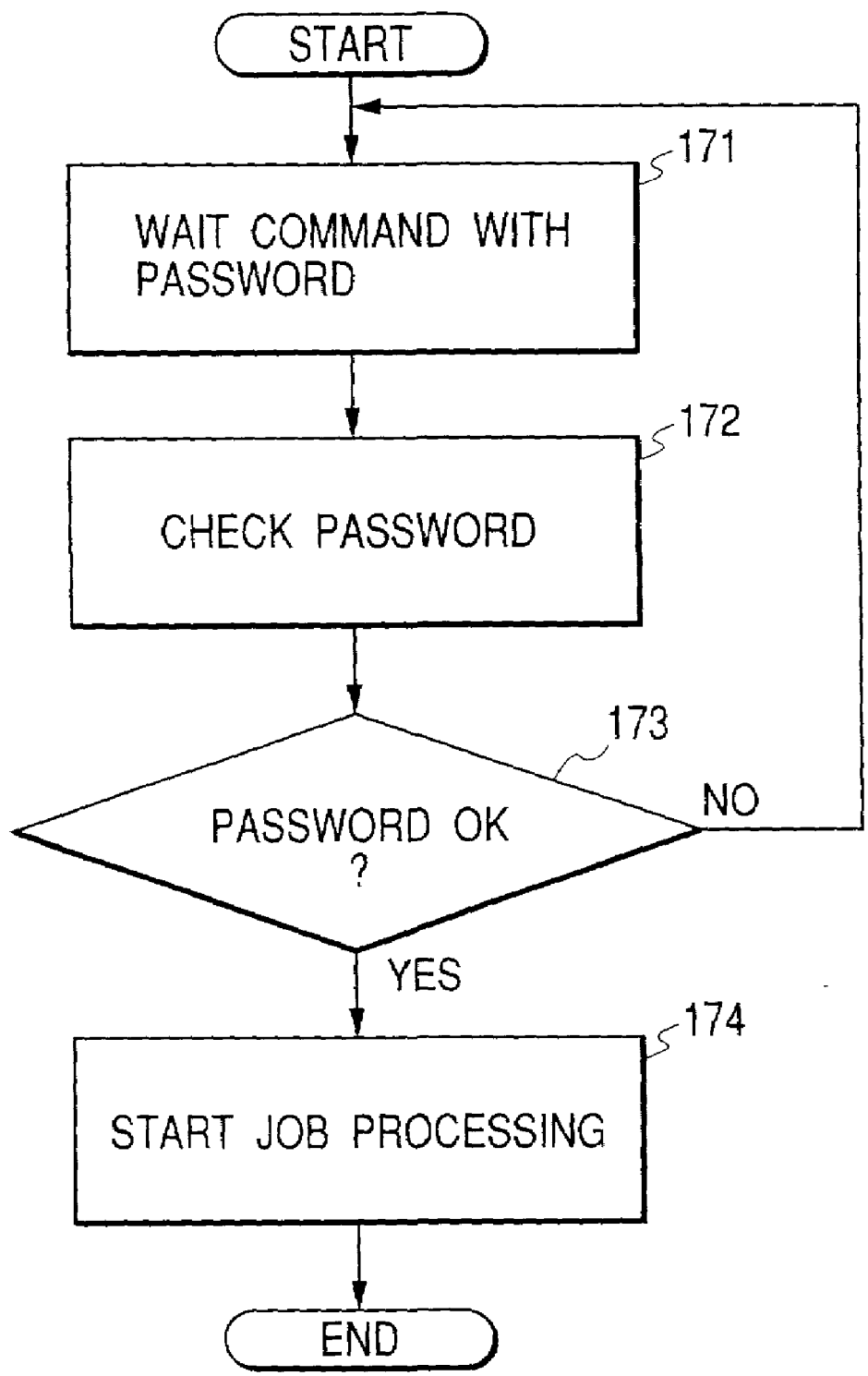
FIG. 16 is a flow chart showing an example of a fourth data processing sequence in the peripheral device.

FIG. 16 is a flow chart showing an example of a fourth data processing sequence in the peripheral device of the present invention, and corresponding to the details of the processing in the "wait start command with password" mode in the step 166 shown in FIG. 15, wherein 171 to 174 indicate process steps.

At first a step 171 holds the assigned job and waits until a start command with password from the user interface 6. When the start command with password is entered, the sequence proceeds to a step 172 for comparing the password entered by the user in association with the start command with password and the "job process start password" set at the job assignment.

Then a step 173 discriminates whether the two passwords match in the comparison in the step 172, and, in case of matching, the sequence proceeds to a step 174, but, if otherwise, the sequence returns to the step 171.

Then a step 174 starts the process of the job, whereupon the process is terminated.

In the foregoing embodiment, even in case the driver installed in the information processing apparatus in order to control the peripheral device does not know the start mode supported by the peripheral device to which the input/output job is to be assigned, it is rendered possible to cause the user of the information processing apparatus to identify the start mode executable by the peripheral device, by analyzing the attribute information indicating the designatable job process start modes, and to arbitrarily set the optimum start mode selected from thus identified start modes according to such attribute information in the peripheral device by the control command.

Also as the job process start mode according to the attribute information obtained from the peripheral device can be the start command waiting mode or the start command with password waiting mode, even if the driver does not know the start modes in advance, it is possible to execute the assigned job with the intended start mode by causing the driver to hold the job assigned to the peripheral device and by transmitting the control command corresponding to the attribute information from the information processing apparatus to the peripheral device.

Furthermore, in case the identified start mode is the start command with password waiting mode, the attribute information contains the maximum value of the settable password so that the setting of a password that cannot be referred in the peripheral device can be securely avoided.

In the foregoing embodiment, there has been explained a method for rendering the start mode selectable in case there is already determined the peripheral device to which the job is assigned. However, it is also possible, even in case plural peripheral devices (MFP's 31, 36, 37) are connected to the network as shown in FIG. 3, to render the user to select a peripheral device having the desired start mode among the plural peripheral devices.

FIG. 18 shows a "list of attributes designatable for the job process start mode" for the respective peripheral devices. Based on this list, the MFP 31 can designate the "wait command with password", "wait command" or "start immediately" as the start mode. Also the MFP 36 can designate the "wait command with password" or "start immediately" as the start mode. Also the MFP 37 can designate the "wait command" or "start immediately" as the start mode.

Figure 19:
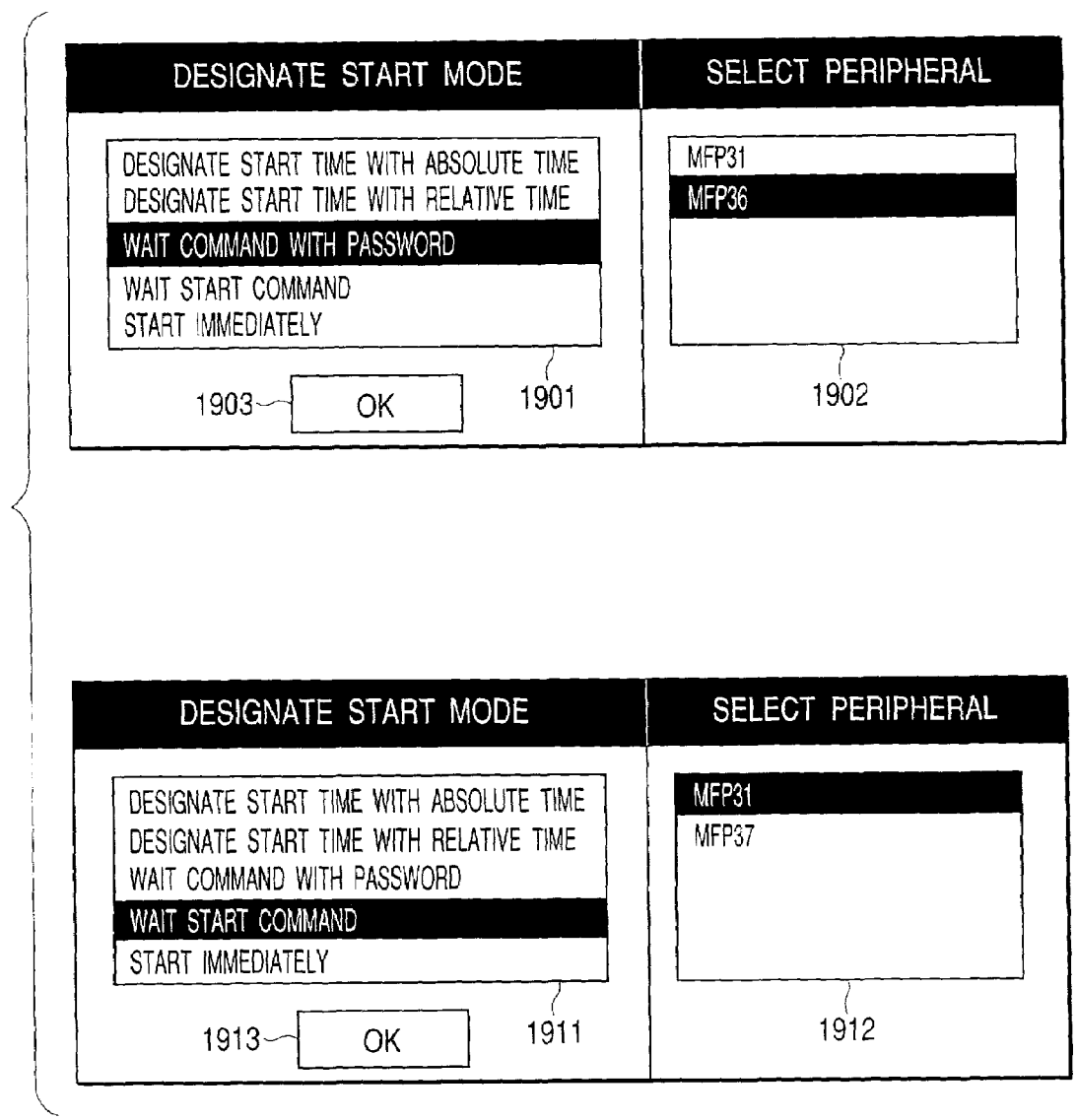
FIG. 19 is a view showing an example of an image for setting "job processing start mode" displayed on a CRT and an image for selecting the peripheral device.

FIG. 19 shows a setting image for the "job process start mode" and a selecting image for the printer. These images are displayed on the display device of the PC 32 (or 33 or 34).

For displaying the images shown in FIG. 19, the driver software executes the attribute information acquiring flow shown in FIG. 8 for each peripheral device thereby acquiring the list of the attribute values settable as the "job process start mode" attribute from each peripheral device.

More specifically, a request for acquiring the "list of supported attributes" is transmitted to the MFP 31 thereby acquiring the attribute list. Then a step 82 in FIG. 8 discriminates whether the "job process start mode" attribute is included in the attribute list, and, if included, a step 83 discriminates whether the "job process start mode" is settable. If settable, a step 84 acquires, from the MFP 31, the list of the attribute values settable as the "job process start mode". Similarly the lists of the attribute values settable as the "job process start mode" are acquired from the MFP's 36 and 37.

Then all the attribute values designatable in the MFP's 31, 36, 37 are displayed in a list box 1901. When the user designates any of the items in the list box 1901, information indicating the peripheral device capable of executing the designating start mode is displayed in a list box 1902. In the example shown in FIG. 18, the "wait command with password" can be designated as the start mode in the MFP's 31 and 36, so that, when the "wait command with password" is designated in the list box 1901, the "MFP 31" and the "MFP 36" are listed in the list box 1902. Also in the example shown in FIG. 18, the "wait command" can be designated as the start mode in the MFP's 31 and 37, so that, when the "wait command" is designated in the list box 1901, the "MFP 31" and the "MFP 37" are listed in the list box 1902.

Then, when an OK button 1903 is depressed, the attribute value designated in the list box 1901 is stored in the attribute value 54-7 and the job is assigned to the peripheral device selected in the list box 1902.

Thus, even in case the user does not know the start mode executable in each peripheral device, the desired start mode can be executed in any of the plural peripheral devices. Also since the driver software can acquire the "list of attribute values designatable as the start mode" from the respective peripheral devices, even if the driver software does not know the start mode executable in each peripheral device at the installation in the PC, the job can be assigned to the peripheral device capable of executing the start mode desired by the user.

<Job Assignment Mode>

Figure 21:
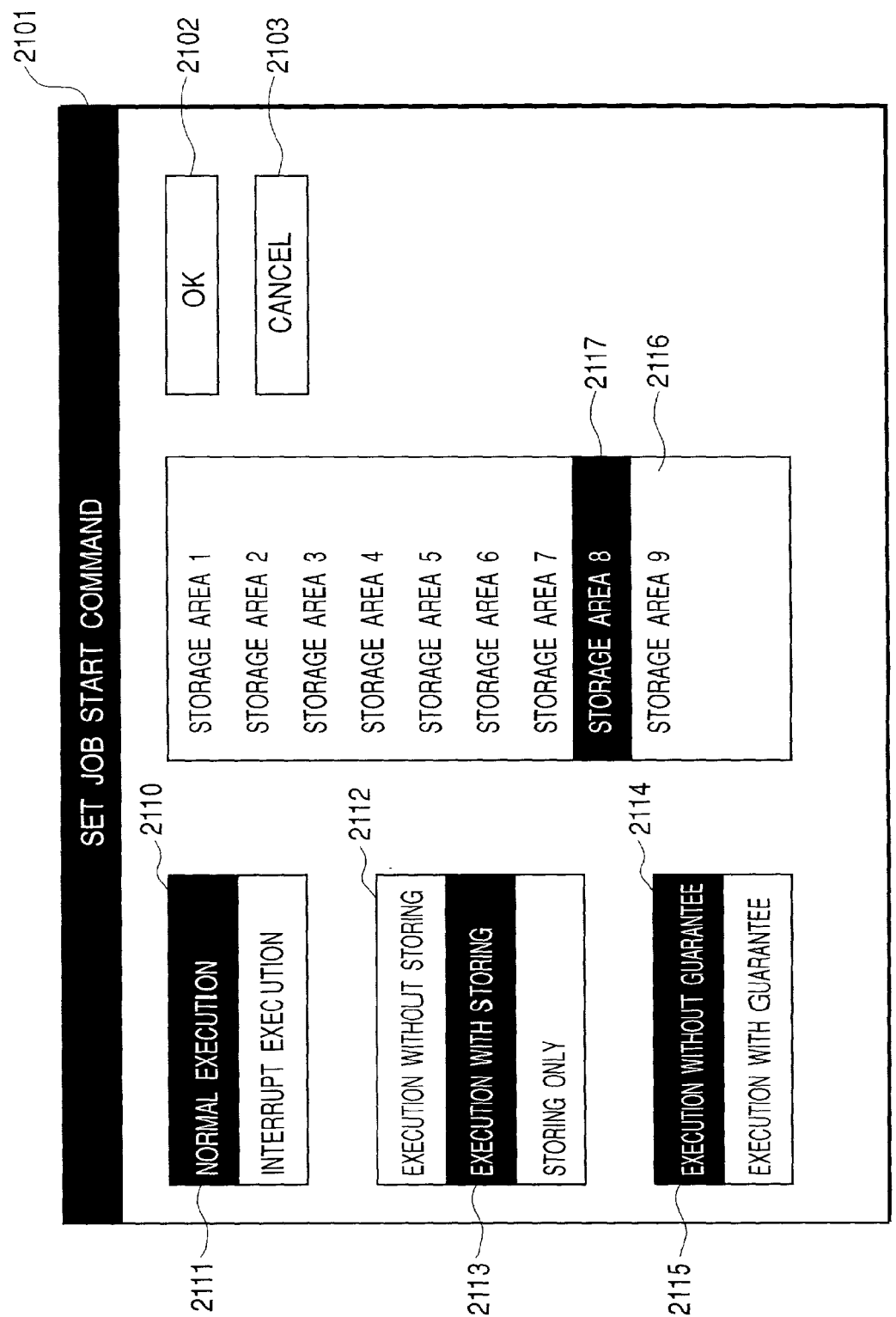
FIGS. 21 and 22 are views showing a user interface for setting "mode of job assignment start command" on a peripheral device control software.

FIG. 21 shows an example of the image for setting the mode of the job assignment start command and additional information. This setting image is displayed at the transmission of the job assignment start command by a job issuing software, and is used in a process flow shown in FIG. 29.

This setting image is displayed on the LCD 23 of the peripheral device or the CRT 43 of the PC 32 (or 33 or 34). The user input (selection of an item in the list box or depression of a button) is executed through the keyboard 24 of the peripheral device or through the keyboard 44 and the pointing device 45 of the PC 32 to 34.

A title 2101 of the setting image briefly explains the setting image and indicates that the setting image is to be used for the "setting of job assignment start command". List boxes 2100, 2112, 2114 display lists of modes designatable at the transmission of the job assignment start command to the peripheral device.

Figure 23:
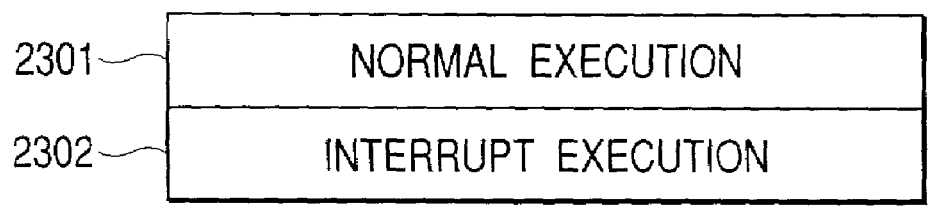
FIG. 23 is a view showing an example of "modes (normal/interruption) designatable as job assignment start command" attribute held by the peripheral device.

The modes listed in the list box 2110 correspond to the attribute values of a "mode (normal/interruption)" of the job assignment start command shown in FIG. 23. The modes listed in the list box 2112 correspond to the attribute values of a "mode (job storage) of the job assignment start command" shown in FIG. 24. The modes listed in the list box 2114 correspond to the attribute values of a "mode (execution guarantee) of the job assignment start command" shown in FIG. 25.

A list box 2116 displays a list of "file storage locations". The content listed in the list box corresponds to that in a "list of designatable file storage locations" shown in FIG. 26. When the present setting image is displayed at first, a default storage location, obtained by the attribute value in the "list of the default file storage locations" shown in FIG. 27, is reversal displayed, indicating a selected state. The list box 2116 is rendered effective in case a mode involving job storage is selected as the mode of the "job assignment start command", and the information selected in this list box is transmitted as additional information of the job assignment start command. More specifically, the selection in the list box 2116 is executed in case the "execution with job storage" or "job storage only" is selected in the list box 2112.

Reversal displays 2111, 2113, 2115, 2117 indicate the "job assignment start command" or the "file storage location" currently selected, and, in FIG. 21, respectively indicate "normal execution", "execution with job storage", "no execution guarantee" and "storage area 8".

The user can select desired set values in the list boxes 2110, 2112, 2114, 2116. An OK button 2102 is used for determining the mode and additional information of the job assignment start command at the values indicated by the reversal displays. Also a cancel button 2103 is used for canceling the setting of the job assignment start command.

Figure 22:
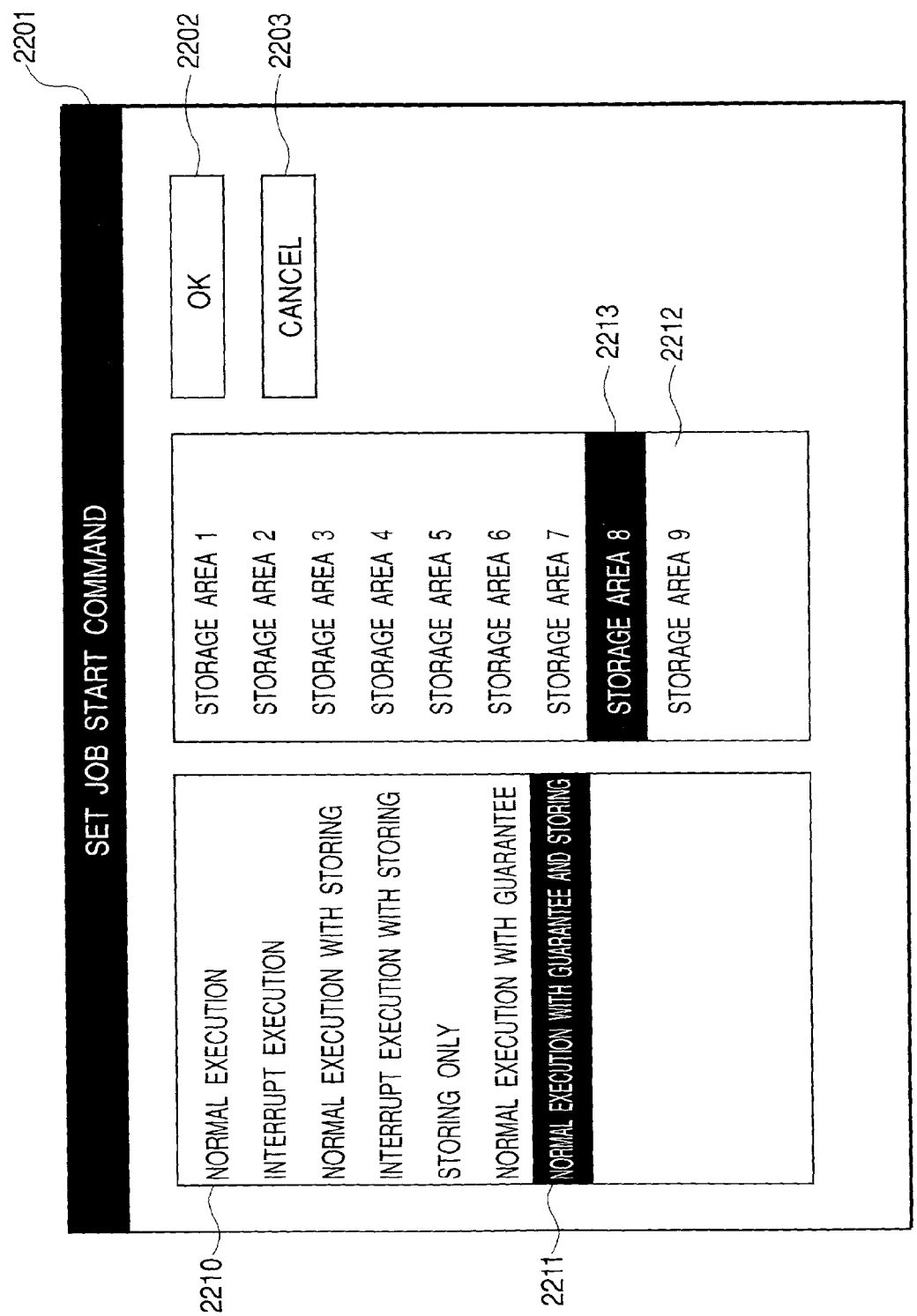

FIG. 22 shows another example of the image for setting the mode and additional information of the job assignment start command. In contrast to FIG. 21 in which the modes of the job assignment start commands are classified by the functions thereof, FIG. 22 shows such modes according to the combination of the functions.

Figure 29:
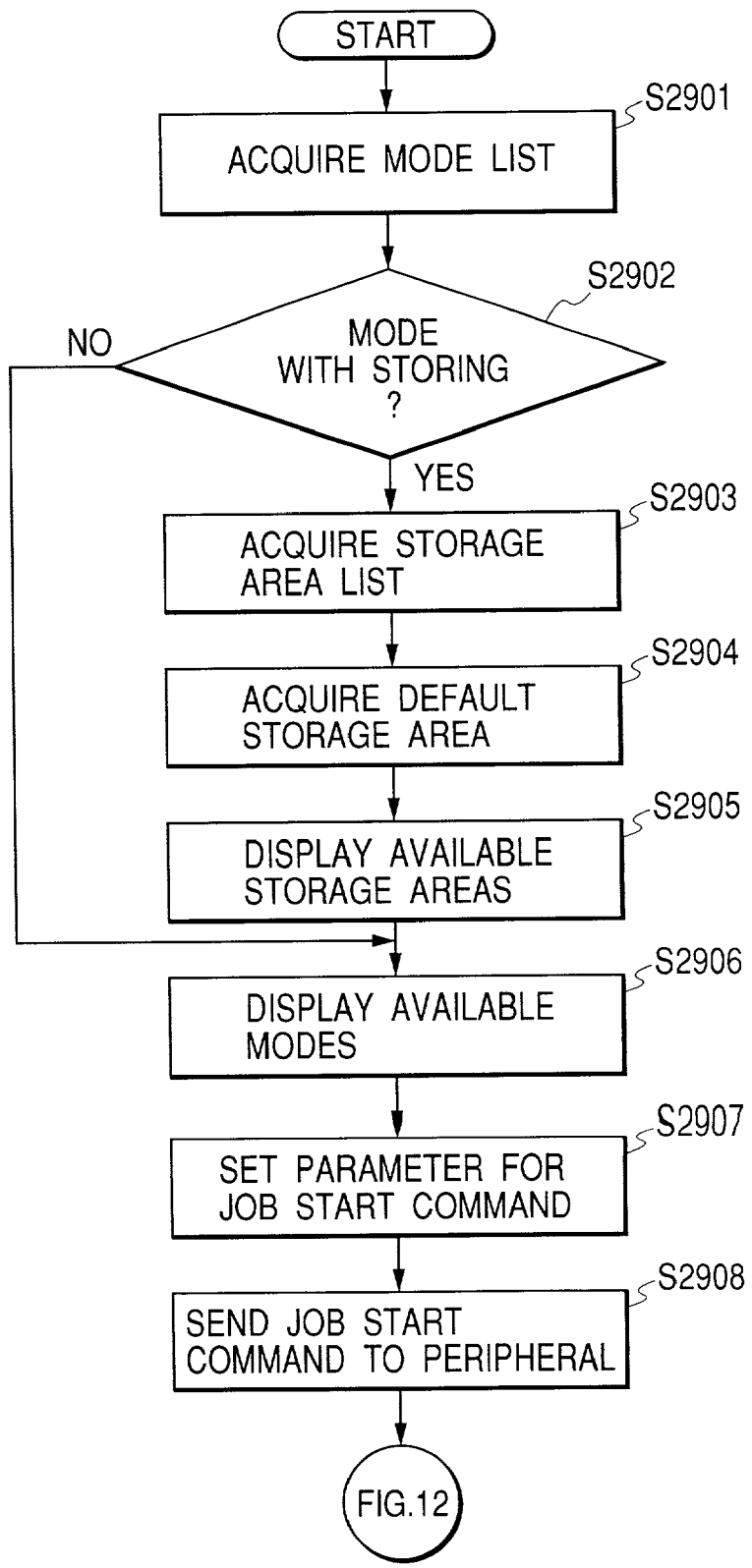
FIG. 29 is a flow chart showing a process of job assignment to a peripheral device in a peripheral device control software.

This setting image is displayed at the transmission of the job assignment start command by the job issuing software, and is used in a process flow shown in FIG. 29.

This setting image is displayed on the LCD 23 of the peripheral device or the CRT 43 of the PC 32 (or 33 or 34). The user input (selection of an item in the list box or depression of a button) is executed through the keyboard 24 of the peripheral device or through the keyboard 44 and the pointing device 45 of the PC 32 to 34.

A title 2201 of the setting image briefly explains the setting image and indicates that the setting image is to be used for the "setting of job assignment start command". A list box 2210 displays a list of modes designatable at the transmission of the job assignment start command to the peripheral device. The modes listed in the list box 2210 correspond to the "modes (mixed) of the job assignment start command" shown in FIG. 26.

A list box 2112 displays a list of "file storage locations". The content listed in the list box corresponds to that in a "list of designatable file storage locations" shown in FIG. 27. When the present setting image is displayed at first, a default storage location, obtained by the attribute value in the "list of the default file storage locations" shown in FIG. 28, is reversal displayed, indicating a selected state.

The list box 2212 is rendered effective in case a mode involving job storage is selected as the mode of the "job assignment start command", and the information selected in this list box is transmitted as additional information of the job assignment start command.

Reversal displays 2211, 2213 indicate the "mode of the job assignment start command" or the "file storage location"

currently selected, and, in FIG. 21, respectively indicate the selection of the "normal execution+guarantee+storage" and "storage area 8".

The user can select desired set values in the list boxes 2210, 2212. An OK button 2202 is used for determining the mode and additional information of the job assignment start command at the values indicated by the reversal displays. Also a cancel button 2203 is used for canceling the setting of the job assignment start command.

FIG. 23 shows an example of the attribute values settable in the "mode (normal/interruption) designatable for the job assignment start command" held by the peripheral device. This information is stored in the ROM 25 or the DISK 30 of the peripheral device. In this attribute, there are listed modes designatable when the job issuing software assigns the job assignment start command to the controller of the peripheral device. Though there are listed modes relating to the interruption execution of the job, but there may also be added other attribute values.

An attribute value "normal execution" 2201 indicates normal execution of the jobs according to the order of assignment thereof. Thus, if another job is under execution in the peripheral device or if other jobs are in a waiting queue at the assignment of the job assignment start command, the process of such assigned job is started after the jobs under execution or in the waiting queue are processed.

An attribute value "interruption execution" 2202 indicates execution of the job by interruption. Thus, if another job is under execution in the peripheral device or if other jobs are in a waiting queue at the assignment of the job assignment start command, the execution of such jobs is interrupted and such assigned job is preferentially executed.

Figure 24:
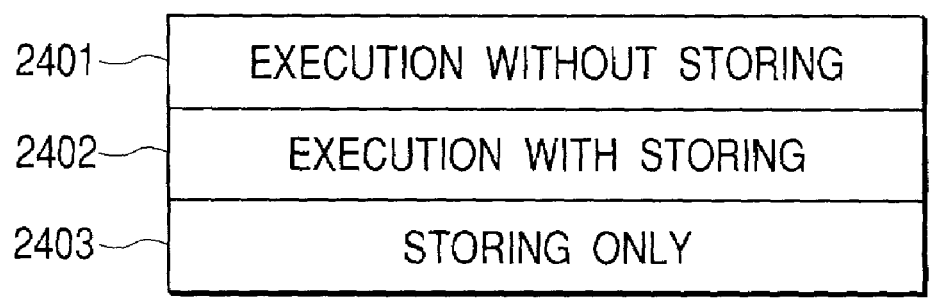
FIG. 24 is a view showing an example of "modes (job storage) designatable as job assignment start command" attribute held by the peripheral device.

FIG. 24 shows an example of the attribute values settable in the "mode (job storage) designatable for the job assignment start command" held by the peripheral device. This information is stored in the ROM 25 or the DISK 30 of the peripheral device. In this attribute, there are listed modes designatable when the job issuing software assigns the job assignment start command to the controller of the peripheral device. Though there are listed modes relating to the job storage, but there may be also added other attribute values.

An attribute value "execution without storage" 2401 indicates normal execution of the job without job storage. Thus, it indicates that the command group instructing the job process is not stored as a file in the peripheral device.

An attribute value "execution with job storage" 2402 indicates execution of the job with storage. Thus, it indicates that the command group instructing the job process is stored as a file in the peripheral device and the job process is also executed.

An attribute value "storage only" 2403 indicates that the job is stored but is not executed. It indicates that the command group instructing the job process is only stored as a file in the peripheral device but the job process is not executed at the job assignment.

Figure 25:
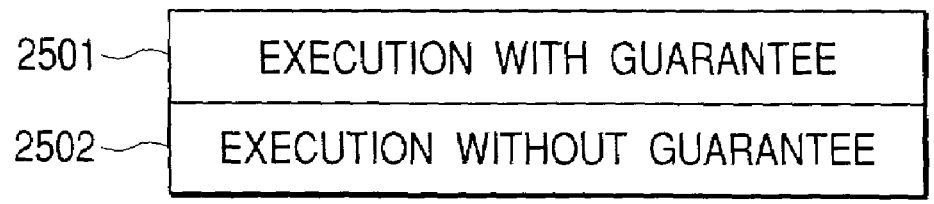
FIG. 25 is a view showing an example of "modes (execution guarantee) designatable as job assignment start command" attribute held by the peripheral device.

FIG. 25 shows an example of the attribute values settable in the "mode (execution guarantee) designatable for the job assignment start command" held by the peripheral device. This information is stored in the ROM 25 or the DISK 30 of the peripheral device. In this attribute, there are listed modes designatable when the job issuing software assigns the job assignment start command to the controller of the peripheral device. Though there are listed modes relating to the execution guarantee, but there may be also added other attribute values.

An attribute value "execution without guarantee" 2501 indicates normal execution of the job. Thus, it indicates that, after the transmission of a command group instructing the job process to the peripheral device, if the peripheral device becomes incapable of the job process by a certain trouble (for example power supply breakdown in the peripheral device), the execution of the job is not guaranteed after the trouble is resolved.

An attribute value "execution with guarantee" 2502 indicates that the execution of the job is guaranteed. Thus, it indicates that, after the transmission of a command group instructing the job process to the peripheral device, if the peripheral device becomes incapable of the job process by a certain trouble (for example power supply breakdown in the peripheral device), the execution of the job is guaranteed after the trouble is resolved.

FIG. 26 shows an example of the attribute values settable in the "mode (mixed) designatable for the job assignment start command" held by the peripheral device. This information is stored in the ROM 25 or the DISK 30 of the peripheral device. In this attribute, there are listed modes designatable when the job issuing software assigns the job assignment start command to the controller of the peripheral device. Though there are listed combinations of the modes relating to the interruption execution, storage and execution guarantee of the job, but there may be also added other attribute values.

An attribute value "normal execution" 2601 indicates normal execution of the jobs in the order of assignment thereof. Thus, it is equivalent to a combined designation of the "normal execution" 2301 in FIG. 23, the "execution without job storage" 2401 in FIG. 24 and the "execution without guarantee" 2501 in FIG. 25.

An attribute value "interruption execution" 2602 indicates the execution of the job by interruption. Thus, it is equivalent to a combination designation of the "interruption execution" 2302 in FIG. 23, the "execution without job storage" 2401 in FIG. 24 and the "execution without guarantee" 2501 in FIG. 25.

An attribute value "normal execution+storage" 2603 indicates storage and execution of the job. Thus, it is equivalent to a combined designation of the "normal execution" 2301 in FIG. 23, the "execution with job storage" 2402 in FIG. 24 and the "execution without guarantee" 2501 in FIG. 25.

An attribute value "interruption execution+storage" 2604 indicates storage and interruption execution of the job. Thus, it is equivalent to a combination designation of the "interruption execution" 2302 in FIG. 23, the "execution with job storage" 2402 in FIG. 24 and the "execution without guarantee" 2501 in FIG. 25.

An attribute value "storage only" 2605 indicates that the job is stored but is not executed. Thus, it is equivalent to a combined designation of the "normal execution" 2301 in FIG. 23, the "storage only" 2403 in FIG. 24 and the "execution without guarantee" 2501 in FIG. 25.

An attribute value "normal execution+guarantee" 2606 indicates that the execution of the job is guaranteed. Thus, it is equivalent to a combination designation of the "normal execution" 2301 in FIG. 23, the "execution without job storage" 2401 in FIG. 24 and the "execution with guarantee" 2502 in FIG. 25.

An attribute value "normal execution+guarantee+storage" 2607 indicates the storage and execution with guarantee of the job. Thus, it is equivalent to a combination designation of the "normal execution" 2301 in FIG. 23, the "execution with job storage" 2402 in FIG. 24 and the "execution with guarantee" 2502 in FIG. 25.

FIG. 27 shows an example of the attribute values settable in the "designatable file storage location" attribute held by the peripheral device. This information is stored in the ROM 25 or the DISK 30 of the peripheral device.

Attribute values "storage area 1" 2701 to "storage area 9" 2709 indicate the "file storage locations" that can be designated. In case a mode involving job storage is designated for the job assignment start command, one of the "file storage locations" listed in this attribute has to be designated as the additional information. The attribute value is represented by a name such as "storage area n", but it may also be represented by another uniquely identifiable information such as an identifier or a handle value indicating the storage location.

FIG. 28 shows an example of the attribute value of the "default file storage location" attribute held by the peripheral device. This information is stored in the ROM 25 or the DISK 30 of the peripheral device.

An attribute value "storage area 8" 2801 is an example of the default "file storage location". In case a mode involving job storage is designated for the job assignment start command, the additional information therefor has to be designated, but, if such designation is not executed, the value of this attribute is adopted as the additional information.

The attribute value is represented by a name such as "storage area n", but it may also be represented by another uniquely identifiable information such as an identifier or a handle value indicating the storage location.

FIG. 29 is a flow chart of the job assignment flow. The job assignment is executed by the job issuing software to the controller in the peripheral device and the present process flow is executed by the job issuing software.

A step S2901 acquires the modes designatable for the job assignment start command, and the sequence proceeds to a step S2902. The job issuing software sends an attribute acquiring command to the controller of the peripheral device, which returns the designated attribute value. In this operation, the controller of the peripheral device executes a process flow for the attribute information access command shown in FIG. 14.

The attributes constituting the object of acquisition are the "mode (normal/interruption) designatable for the job assignment start command" attribute shown in FIG. 23, the "mode (job storage) designatable for the job assignment start command" attribute shown in FIG. 24, the "mode (execution guarantee) designatable for the job assignment start command" attribute shown in FIG. 23 and the "mode (mixed) designatable for the job assignment start command" attribute shown in FIG. 26.

A step S2902 discriminates whether a mode involving job storage is included in the "mode (job storage) designatable for the job assignment start command" attribute shown in FIG. 24 or the "mode (mixed) designatable for the job assignment start command" attribute shown in FIG. 26, and, if included, the sequence proceeds to a step S2903, but, if not, the sequence proceeds to a step S2906.

A step S2903 acquires the "file storage locations" designatable as the additional information, and the sequence proceeds to a step S2904. The job issuing software sends an attribute acquiring command to the controller of the peripheral device, which returns the designated attribute value. In this operation, the controller of the peripheral device executes a process flow for the attribute information access command shown in FIG. 14. The attribute constituting the object of acquisition is the "designatable file storage locations" attribute shown in FIG. 27.

A step S2904 acquires the default "file storage location", and the sequence proceeds to a step S2905. The job issuing software sends an attribute acquiring command to the controller of the peripheral device, which returns the designated attribute value. In this operation, the controller of the peripheral device executes a process flow for the attribute information access command shown in FIG. 14. The attribute constituting the object of acquisition is the "default file storage location" attribute shown in FIG. 28.

A step S2905 executes setting of the "file storage location", and the sequence proceeds to a step S2906. The list of the "file storage locations" obtained in the step S2904 is displayed in the list box 2116 of the setting image for the job assignment start command shown in FIG. 21 or in the list box 2212 of the setting image for the job assignment start command shown in FIG. 22, and the default "file storage location" obtained in the step S2905 is reversal displayed.

A step S2906 executes setting of the modes designatable for the job assignment start command, and the sequence proceeds to a step S2907. The list of the modes obtained in the step S2901 is displayed in the list box 2110, 2112, 2114 of the setting image for the job assignment start command shown in FIG. 6 or in the list box 2210 of the setting image for the job assignment start command shown in FIG. 22.

A step S2907 provides the user with a setting image for the job assignment start command shown in FIG. 21 or 22, thereby causing the user to select the mode and the additional information required for the job assignment start command.

A step S2908 sends the job assignment start command together with the selected mode and additional information to the controller of the peripheral device. After the step S2908, there is executed the process shown in FIG. 12.

Figure 30:
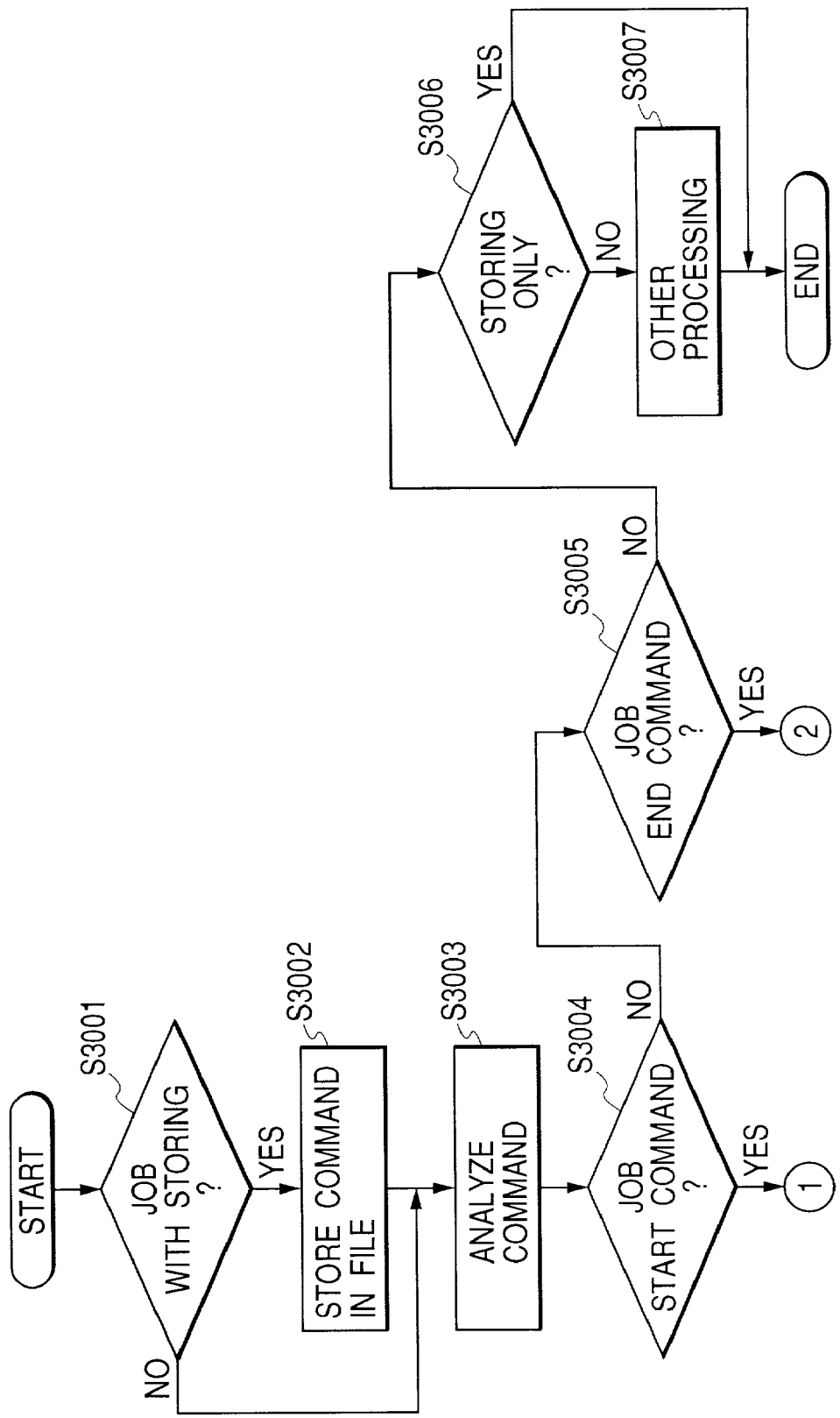
FIG. 30 is a flow chart showing a process of job reception in the peripheral device.
Figure 31:
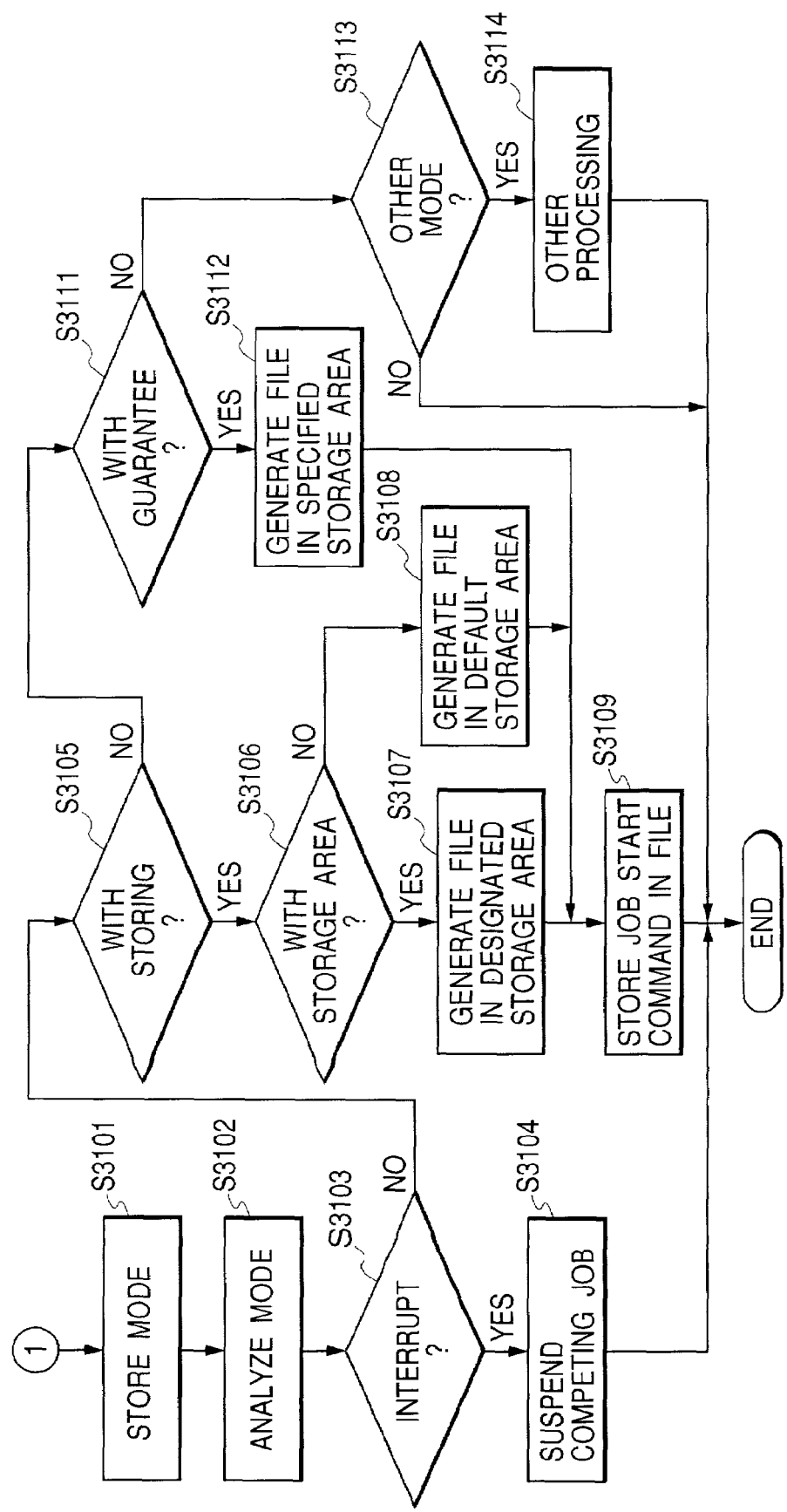
FIG. 31 is a flow chart showing a process for a job assignment start command.
Figure 32:
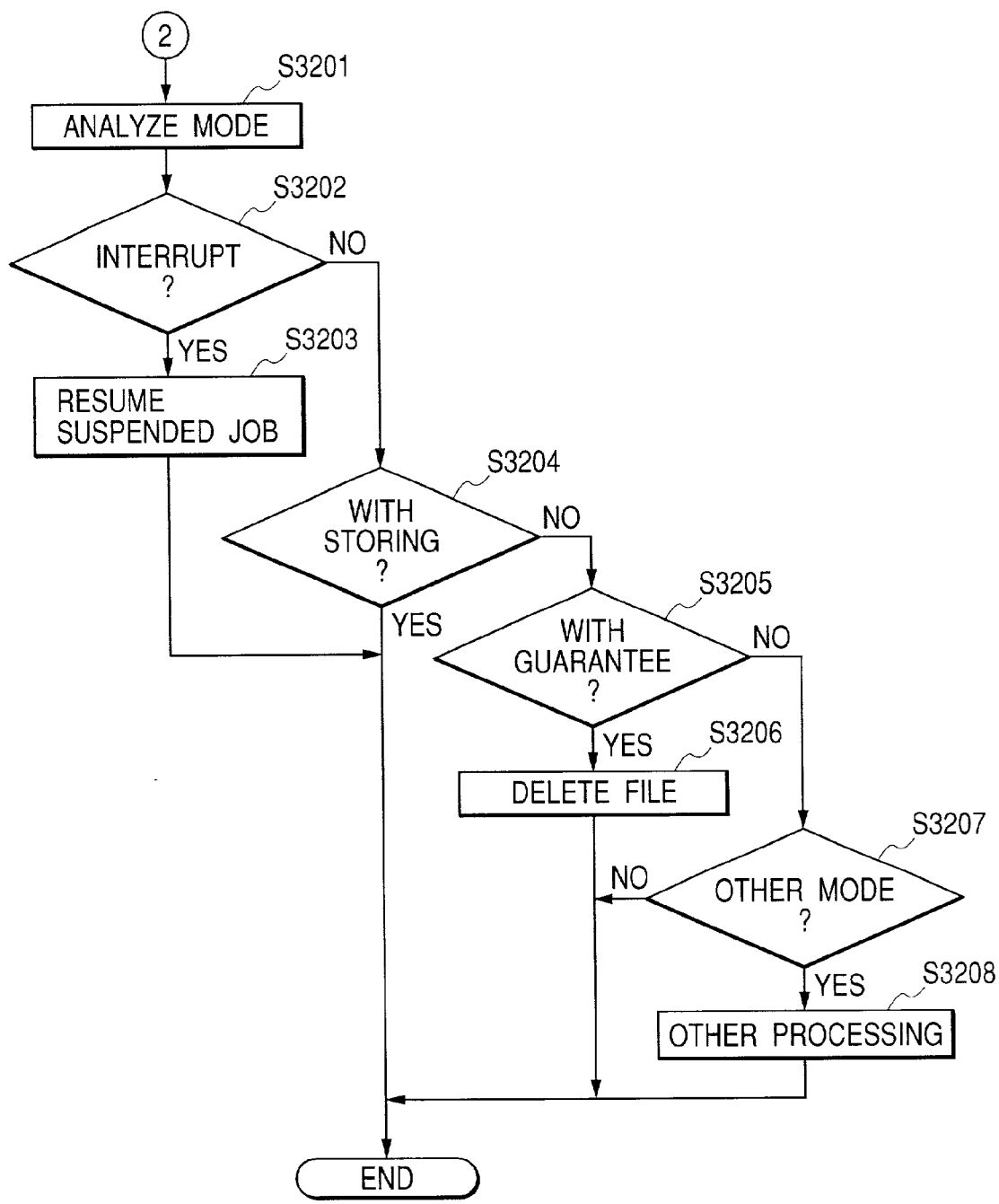
FIG. 32 is a flow chart showing a process for a job assignment completion command.

FIGS. 30 to 32 show a process flow for job reception. The controller of the peripheral device receives a group of job process commands transmitted from the job issuing software. This process flow is executed by the controller of the peripheral device.

A step S3001 discriminates the mode designated in the job assignment start command. However, this discrimination is not executed at the reception of the job assignment start command, received as the instruction for starting the job, but is executed after the storage of the mode designated by the job assignment start command in a step S3101 shown in FIG. 31.

If the stored mode involves job storage, the sequence proceeds to a step S3002, but, if otherwise, the sequence proceeds to a step S3003. A step S3002 executes a process of file storage of the received command, and a step S3003 analyzes the received command and the parameters thereof.

A process starting with a step S3004 and shown in FIG. 31 is executed in case the analysis identifies that the received command is a job assignment start command. FIG. 31 describes a process specific to the present invention, and other processes required in association with the job assignment start command are assumed to have been completed at the point of the step S3004.

A process starting with a step S3005 and shown in FIG. 32 is executed in case the analysis identifies that the received command is a job assignment end command. FIG. 32 describes a process specific to the present invention, and other processes required in association with the job assignment end command are assumed to have been completed at the point of the step S3005.

A step S3006 is executed in case the analysis identifies that the received command is another command, and discriminates the mode of the job assignment start command stored in the step S3101 shown in FIG. 31, and the sequence proceeds to a step S3007 in case the mode is not for the storage only, but the sequence is terminated in case the mode is for the storage only. A step S3007 executes a process corresponding to the designated command, whereupon the sequence is terminated.

FIG. 31 is a continuation of the process in case the step S3003 in FIG. 30 identifies that the received command is a job assignment start command. This process flow is executed by the controller of the peripheral device.

A step S3101 stores the mode designated by the job assignment start command. The stored mode is used in the discriminations of the steps S3001, S3006 in FIG. 30 and in a step S3201 in FIG. 32. A step S3102 analyzes the designated mode.

Steps S3103 and S3104 are executed in case the mode is identified to involve interruption as the result of analysis, and, in such case, the sequence proceeds to a step S3104 to interrupt a job process competing with the job process designated by the job assignment start command, whereupon the sequence is terminated.

Steps S3105 to S3109 are executed in case the mode is identified to involve job storage as the result of analysis, and, in such case, the sequence proceeds to a step S3106 to discriminate whether file storage location is designated. If designated, the sequence proceeds to a step S3107, but, if not, the sequence proceeds to a step S3108. A step S3107 generates a job storage file in the designated storage location, and the sequence proceeds to a step S3109.

A step S3108 generates a job storage file in the storage location obtained by referring to the "default file storage location" attribute held by the peripheral device, and the sequence proceeds to a step S3109. A step S3109 records the job assignment start command in the generated job storage file, whereupon the sequence is terminated.

Steps S3111, S3112 and S3109 are executed in case the mode is identified to involve execution guarantee as the result of analysis, and, in such case, the sequence proceeds to a step S3112 to generate a job storage file in a storage area internally defined in the peripheral device, and then to a step S3109. A step S3109 records the job assignment start command in the generated job storage file, whereupon the sequence is terminated.

In case the step S3111 identifies that the mode does not involve execution guarantee, the sequence proceeds to a step S3113 to discriminate whether any other mode is designated by the job assignment start command. If none, the sequence is terminated, but, if any, a step S3114 executes a process corresponding to such designated mode whereupon the sequence is terminated.

The files generated in the steps S3107, S3108 and S3112 are stored in the DISK 30 of the peripheral device.

FIG. 32 is a continuation of the process in case the step S3003 in FIG. 30 identifies that the received command is a job assignment end command. This process flow is executed by the controller of the peripheral device.

A step S3201 divides the process according to the mode of the job assignment start command stored in the step S3101 in FIG. 31.

In case the mode involves interruption (step S3202), the sequence proceeds to a step S3203 for restarting the execution of the interrupted job, whereupon the sequence is terminated.

In case the mode involves job storage (step S3204), the sequence is terminated.

In case the mode involves execution guarantee (step S3205), the sequence proceeds to a step S3206 for deleting the job storage file generated in the step S3112 in FIG. 31, whereupon the sequence is terminated.

In case the step S3205 identifies that the mode does not involve execution guarantee, the sequence proceeds to a step S3207 for discriminating whether any other mode is designated by the job assignment start command. If none, the sequence is terminated, but, if any, a step S3208 executes a process corresponding to such designated mode whereupon the sequence is terminated.

Figure 33:
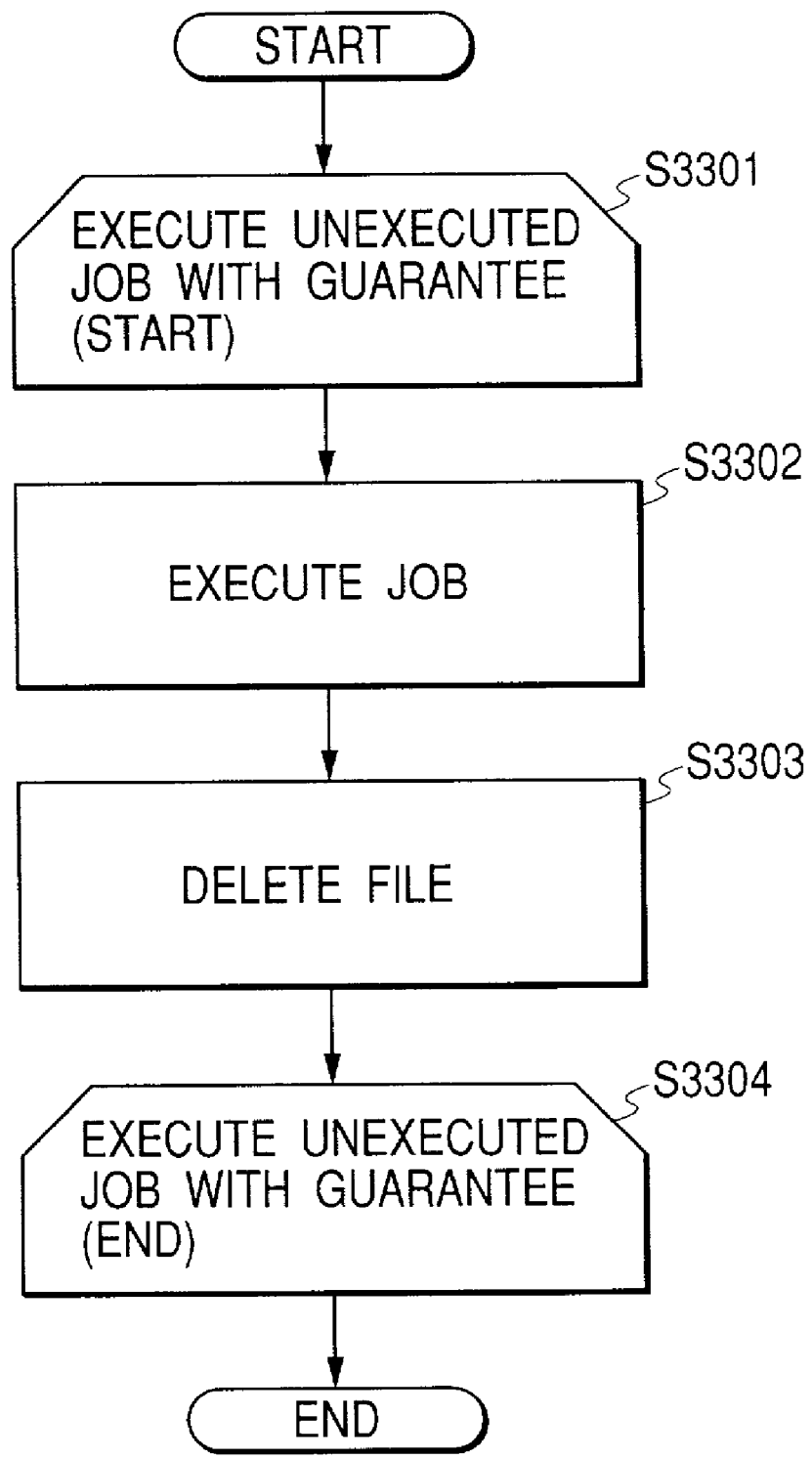
FIG. 33 is a flow chart showing an execution guarantee job process in the peripheral device.

FIG. 33 shows a process flow for an execution guarantee job. This process flow is executed by the controller of the peripheral device, and, at the activation thereof, discriminates whether a job designated for execution guarantee remains unexecuted, and, if such unexecuted job is present, executes such job.

A process of the steps S3301 to S3304 is repeated until the unexecuted execution guarantee jobs, stored in the storage area internally defined in the peripheral device, are exhausted. A step S3302 executes job process according to the command group in the job storage file, and the sequence proceeds to a step S3303 after the completion of the job process. The storage file is generated in the step S3112 in FIG. 31 and is stored in the DISK 210 of the peripheral device.

A step S3303 deletes the job storage file. A loop process of the steps S3301 to S3304 executes or deletes all the unexecuted execution guarantee jobs, and the present process flow is terminated upon completion of the loop process.

<Job Deletion Mode>

FIG. 34 shows the "list of attributes supported by the job" in which an attribute "job deletion mode" 3407 is added to the list shown in FIG. 6. In case the "job deletion mode" is settable, there can be set a job deletion mode as explained in the following.

FIG. 35 is a view showing a "list of attributes designatable for the job deletion mode", held by the peripheral device. This information is stored in the ROM 25 or the DISK 30 shown in FIG. 2. The "list of attributes designatable for the job deletion mode" shown in FIG. 35 lists the attribute values designatable by the driver software as the value of the "job deletion mode" attribute held by the job to be processed by the peripheral device. However, the attribute values contained in the "list of attributes designatable for the job deletion mode" may be other than those shown in FIG. 35.

In the present embodiment, it is assumed that the "job deletion mode" attribute is listed in the "attribute list supported by the job" held by the peripheral device, as shown in FIG. 21, and that other attributes required according to the set value of the "job deletion mode" attribute are also listed in the "attribute list supported by the job" shown in FIG. 21.

The "job deletion mode" attribute indicates the setting of a condition for job deletion assigned by the driver software, and the setting of the "job deletion mode" attribute allows to control the deletion of the assigned job.

In FIG. 35, an attribute value "designated by absolute time" 3501 indicates that the deletion time after the job assignment is designated by an absolute time and that the job is deleted when the deletion time is reached. The attribute value also includes the designated deletion time.

Also an attribute value "designate by relative time" 3502 indicates that the deletion time after the job assignment is designated by a relative time and that the job is deleted when the deletion time is reached. The attribute value also includes the designated deletion time.

FIG. 36 shows an example of a setting image for the "job deletion mode" attribute. This setting image is used by the user for setting the "job deletion mode" attribute at the job assignment to the peripheral device and is displayed on the CRT 43 of the PC 32 to 34 or on the LCD 23 of the peripheral device.

It is assumed that the driver software, prior to the generation of the setting image shown in FIG. 36, acquires a list of the values settable as the "job deletion mode" attribute by the device information acquiring flow shown in FIG. 8.

Referring to FIG. 36, a title 3600 of the setting image briefly explains the setting image and indicates that the setting image is to be used for setting the value of the "job deletion mode" attribute.

A list box 3601 displays a list of the attribute values designatable for the "job deletion mode" attribute. The attribute values listed in the list box 3601 correspond to the values listed in the "job deletion mode" attribute shown in FIG. 35. The user can select a desired value from the list box 3601, utilizing the keyboard 44 and the pointing device 45 of the PC 32 to 34.

A reversal display 3602 indicates the currently selected value of the "job deletion mode" attribute. In the example shown in FIG. 36, there is selected "designate by absolute time". An OK button 3603 is used for determining the attribute value of the assigned job at the value indicated by the reversal display 3602.

FIG. 37 shows a setting image to be used by the user for setting the job deletion time after the job assignment in case the user selects "designate by absolute time" in the setting image for the "job deletion mode" attribute shown in FIG. 36. This setting image is displayed on the CRT 43 of the PC 32 (or 33 or 34).

It is assumed that the PC 32 (or 33 or 34) displaying the setting image shown in FIG. 37, prior to the generation of the image shown in FIG. 37, acquires the "maximum value of the elapsed time designatable for the job deletion time" by the device information acquiring flow shown in FIG. 8. In the setting image shown in FIG. 37, there is also prepared a check box 3704 for setting the "deletion during job execution" attribute by the user.

In FIG. 37, a title 3700 of the setting image briefly explains such image and indicates that such setting image is to be used for designating the job deletion time by absolute time. In an edit box 3701, the user enters an absolute time for deleting the job. A check box 3704 is provided for designating the process in case the job is under execution when the absolute time designated by the user is reached. If the check box 3704 is checked, the peripheral device forcedly deletes the job when the designated absolute time is reached, even if such job is under execution.

An OK button 3702 is used for determining the designated deletion time of the assigned job at the value entered into the edit box 3701. It is also used for determining the check mark in the check box 3704.

In the setting image shown in FIG. 37, a text 3703 indicates the time range settable by the user. In the present embodiment, the maximum value of the elapsed time designatable for the job deletion time is defined as 2 days. Based on this value, the designatable time range is calculated and is displayed in the text 3703. In the example shown in FIG. 37, an arbitrary time until 12:00 hours on Jan. 25, 2000 can be entered into the edit box 3701.

In case the user selects "designate by relative time" in FIG. 36, the job deletion time can be designated by relative time in a setting image similar to that shown in FIG. 37. In such case, there is displayed the maximum value of the designatable relative time.

Figure 41:
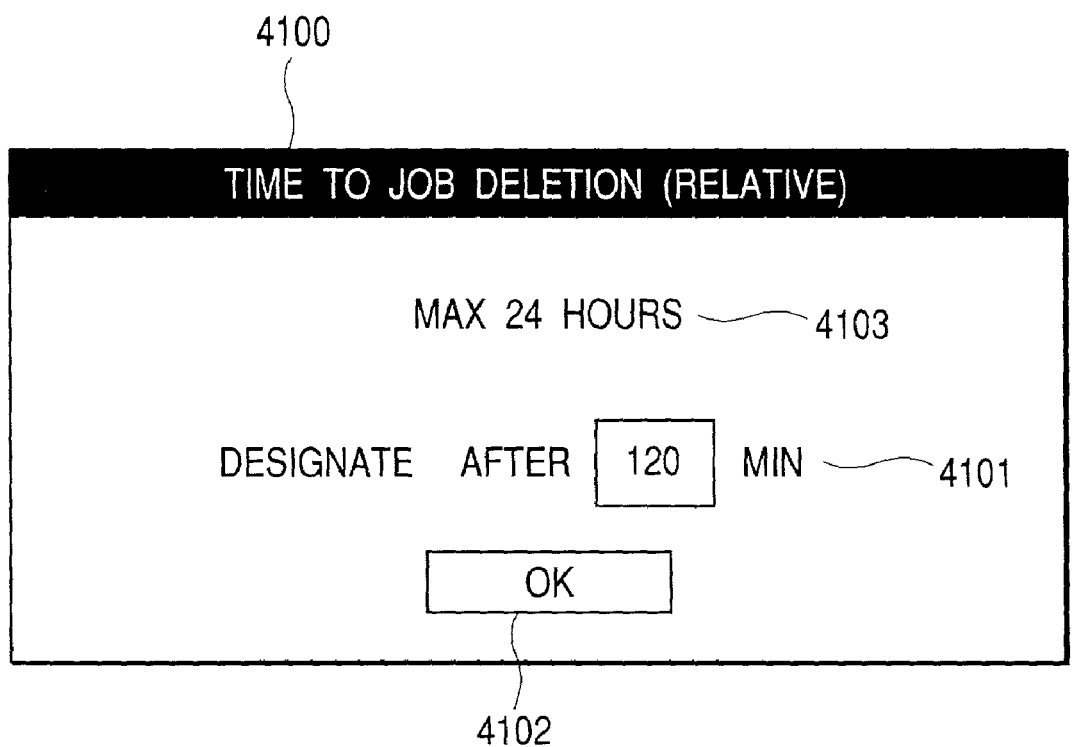
FIG. 41 is a view showing a setting image displayed in case a relative time is designated in the setting image for the "job deletion mode" attribute.

FIG. 41 shows a setting image displayed when the "designate by relative time" is selected. This setting image is displayed on the CRT 43 of the PC 32 (or 33 or 34).

It is assumed that, prior to the display of the image shown in FIG. 41, the "maximum value of the elapsed time designatable for the job deletion time after the job execution" is acquired by the device information acquiring flow shown in FIG. 8.

In FIG. 41, a title 4100 of the setting image briefly explains such image and indicates that such setting image is to be used for designating the deletion time after the job execution by relative time. In an edit box 4101, the user enters a relative time for deleting the job after the job execution.

An OK button 4102 is used for determining the designated deletion time of the assigned job at the value entered into the edit box 4101. A text 4103 indicates the maximum value of the relative time settable by the user.

Figure 38:
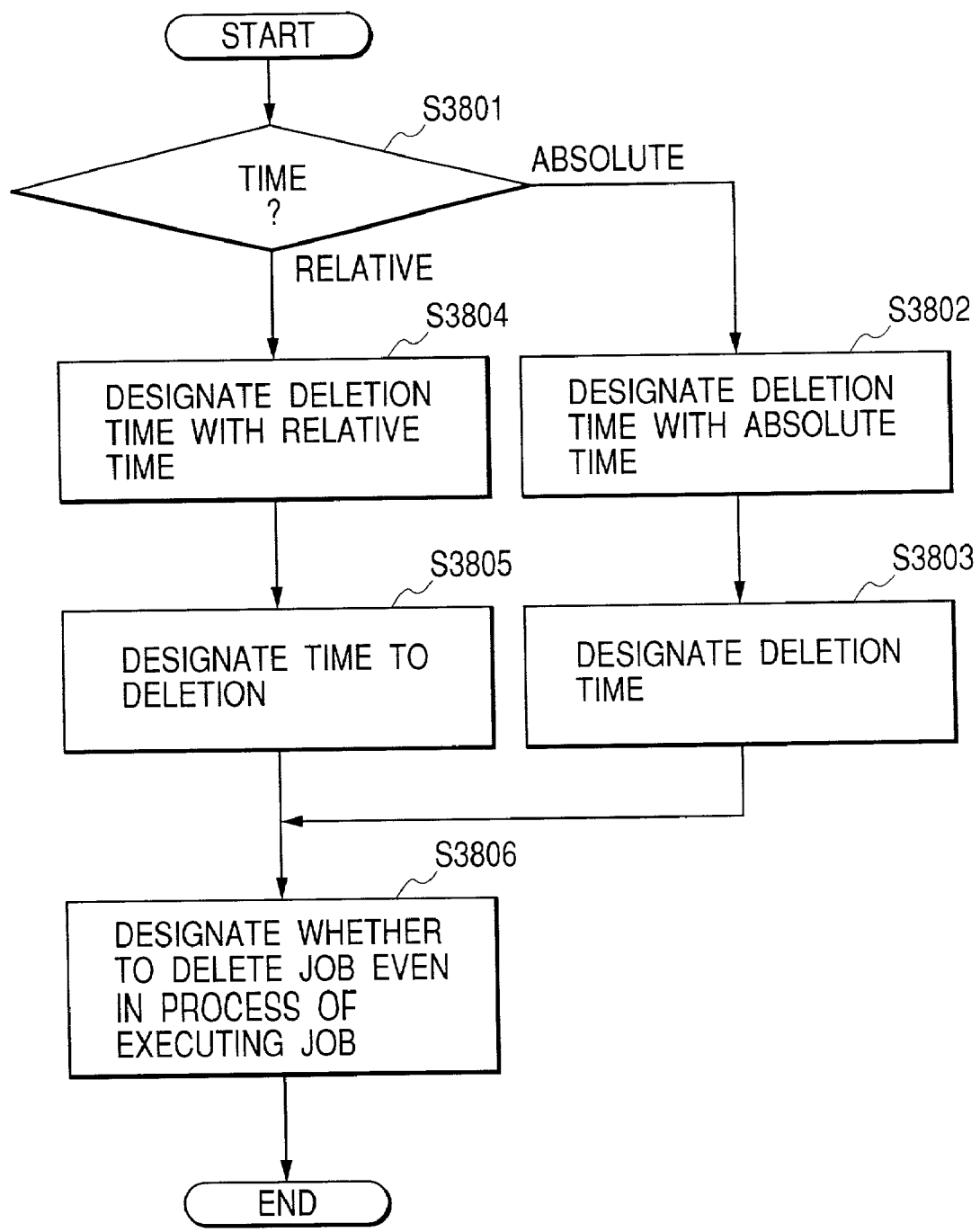
FIG. 38 is a flow chart showing a process for designating a job deletion time.

FIG. 38 is a flow chart showing the process flow in which the driver software, at the job assignment to the peripheral device, designates the job deletion time utilizing the "job deletion mode" attribute.

At first a step S3801 displays a setting image as shown in FIG. 36 and discriminates whether the absolute time mode or the relative time mode is designated for the job deletion mode. The sequence proceeds to a step S3802 if the user selects the absolute time mode in which the job is deleted at designated time and date, but the sequence proceeds to a step S3804 if the user selects the relative time mode in which the job is deleted after the lapse of a designated time from the job assignment.

A step S3802 sets "designate by absolute time" in the "job deletion mode" attribute 3407, and then a step S3803 displays an image shown in FIG. 37 for designating the absolute time and causes the user to enter the desired job deletion time by an absolute time.

A step S3804 sets "designate by relative time" in the "job deletion mode" attribute 3407, and then a step S3805 displays an image for designating the absolute time, similar to that shown in FIG. 37, and causes the user to enter the desired job deletion time by a relative time.

A step S3806 sets whether or not the job is deleted at the designated date and time even if the job is under execution, whereupon the sequence is terminated.

Figure 40:
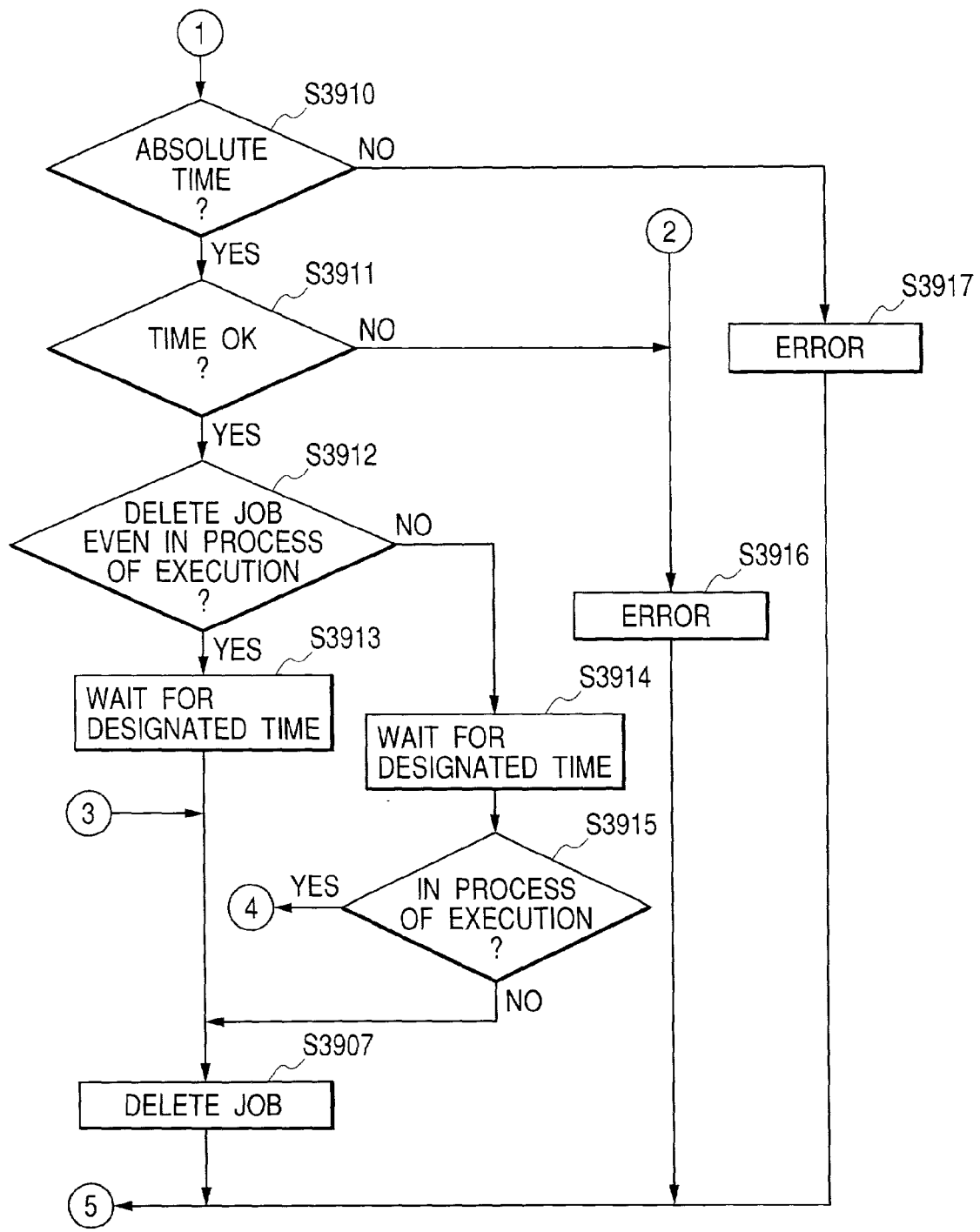

FIGS. 39 and 40 are flow charts of a flow to be executed in succession to the step 140 in FIG. 13. The process shown in FIG. 39 is executed instead of or together with the process shown in FIG. 15.

A step S3901 discriminates whether the "job deletion mode" attribute is set, and, if not, the sequence proceeds to a step S3902 for deleting the job after execution thereof, whereupon the sequence is terminated. On the other hand, if the "job deletion mode" attribute is set, the sequence proceeds to a step S3903.

A step S3903 discriminates whether the value of the "job deletion mode" attribute is "designate by relative time", and, if so, the sequence proceeds to a step S3904, but, if not, the sequence proceeds to a step S3910.

A step S3904 discriminates whether the designated relative time exceeds the maximum designatable value of the elapsed time, and the sequence proceeds to a step S3916 or S3905 respectively if the maximum designatable value is exceeded or not.

A step S3905 discriminates whether the setting is so made as to forcedly delete the job even in case the job is under execution at the designated time. If so set, the sequence proceeds to a step S3906 to wait until the lapse of the designated time, and, when the designated time elapses, a step S3907 deletes the job whereupon the sequence is terminated.

On the other hand, if the setting is not to execute deletion during the job execution, the sequence proceeds to a step S3908 to wait until the lapse of the designated time, and, when the designated time elapses, a step S3909 discriminates whether the job is under execution. If not, the sequence proceeds to a step S3907 to delete the job, whereupon the sequence is terminated. If the job is under execution, the sequence proceeds to the step S3902 for deleting the job after execution thereof, whereupon the sequence is terminated.

A step S3910 discriminates whether the value of the "job deletion mode" attribute is "designate by absolute time", and, if so, the sequence proceeds to a step S3911, but, if not, the sequence proceeds to a step S3917.

A step S3911 compares the designated absolute time with the current time and discriminates whether the designated absolute time exceeds the maximum designatable value of the elapsed time, and the sequence proceeds to a step S3916 or S3912 respectively if the maximum designatable value is exceeded or not.

A step S3912 discriminates whether the setting is so made as to forcedly delete the job even in case the job is under execution at the designated time. If so set, the sequence proceeds to a step S3913 to wait until the designated time, and, when the designated time is reached, a step S3907 deletes the job whereupon the sequence is terminated.

On the other hand, if the setting is not to execute deletion during the job execution, the sequence proceeds to a step S3914 to wait until the designated time, and, when the designated time is reached, a step S3915 discriminates whether the job is under execution. If not, the sequence proceeds to a step S3907 to delete the job, whereupon the sequence is terminated.

If the job is under execution, the sequence proceeds to the step S3902 for deleting the job after execution thereof, whereupon the sequence is terminated.

A step S3917 executes an error process for an incorrect designated value of the "job deletion mode" attribute, whereupon the sequence is terminated. Also a step S3916 executes an error process for the designation of a value exceeding the maximum designatable value of the elapsed time for the job deletion time, whereupon the sequence is terminated.

As explained in the foregoing, the present invention allows to discriminate whether a mode for deleting the assigned job can be designated. Also in case the designation is possible, there is inquired to the peripheral device whether the job deletion can be executed by the designation of an absolute time or a relative time, and the user is enabled to select either of these methods.

In the following there will be explained the configuration of a data processing program readable by an image processing system in which the information processing apparatus and the peripheral device of the present invention are applicable, with reference to a memory map shown in FIG. 17.

FIG. 17 shows a memory map of a memory medium, storing various data processing programs readable by a printing system in which a print control apparatus of the present invention is applicable.

Though not illustrated, there may also be stored information for managing the programs stored in the memory medium, such as version information, author information etc., and information dependent on the operating system of the program reading side, such as icons for identifying the programs.

Furthermore, data belonging to the programs are also managed by the above-mentioned directory. Also there may be stored a program for installing various programs into the computer, and a thawing program to be used in case the programs to be installed are compressed.

The functions of the present embodiment, shown in FIGS. 8, 11, 12 and 13 to 16 may be achieved by a host computer, through a program installed from the exterior. The present invention is applicable in such case, namely in case the information including programs is supplied to the output apparatus from a memory medium such as a CD-ROM, a flush memory or an FD, or through a network from an external memory medium.

The objects of the present invention can naturally be attained also in case where a memory medium storing program codes of a software realizing the functions of the aforementioned embodiments is supplied to a system or an apparatus and a computer (or CPU or MPU) of such system or apparatus reads and executes the program codes stored in the memory medium.

In such case, the program codes themselves read from the memory medium realize the novel functions of the present invention, and the program codes themselves or the memory medium storing such program codes constitutes the present invention.

The memory medium for supplying the program codes can be, for example, a floppy disk, a hard disk, an optical disk, a magnetooptical disk, a CD-ROM, a CD-R, a magnetic tape, a non-volatile memory card, a ROM or an EEPROM.

The present invention naturally includes not only a case where the functions of the aforementioned embodiments are realized by the execution of the read program codes by the computer, but also a case where an OS (operating system) or the like functioning on the computer executes all the process or a part thereof under the instruction of such program codes, thereby realizing the functions of the aforementioned embodiments.

The present invention further includes a case where the program codes read from the memory medium are once stored in a memory provided in a function expansion board inserted in the computer or a function expansion unit connected thereto and a CPU or the like provided in such function expansion board or function expansion unit executes all the process or a part thereof under the instruction of such program codes, thereby realizing the functions of the aforementioned embodiments.

In the present invention, as explained in the foregoing, even in case the driver software installed in the information processing apparatus for the purpose of controlling the peripheral device does not know in advance the start mode for the peripheral device to which the job is to be assigned, the user of the information processing apparatus can identify the start mode executable in the peripheral device.

Also the desired start mode, selected by the user from the identified start modes, can be arbitrarily set in the peripheral device by the control command. In particular, it is possible to set, in the peripheral device, a mode of starting the job process after a start command, such as a mode for awaiting a start command or a mode for awaiting a start command with password, thereby arbitrarily controlling the timing and condition of starting the job output according to the need of the user.

Also, even if the user does not know the start mode executable in each peripheral device, the desired start mode can be executed in one of the plural peripheral devices. Also, since the driver software acquires a "list of attribute values designatable for the start mode" from each peripheral device, the job can be assigned to the peripheral device capable of executing the start mode desired by the user, even if the driver software does not know, at the installation thereof into the information processing apparatus, the start mode executable in each peripheral device.

What is claimed is:

1. An information processing apparatus capable of communicating with a printer, comprising:
    a first acquiring unit adapted to acquire from the printer an attribute list including a plurality of attributes supported by the printer;
    a determination unit adapted to determine for each of the plurality of attributes included in the attribute list acquired by said first acquiring unit whether the attribute corresponds to software that operates on said information processing apparatus;
    a second acquiring unit adapted to acquire from the printer an attribute value of one of the plurality of attributes determined by said determination unit to correspond to the software;
    a control unit adapted to control a setting screen of the software to reflect the attribute value acquired by said second acquiring unit; and
    a job output unit adapted to generate a print job based on a setting entered via the setting screen that has reflected the attribute value and output the generated print job to the printer,
    wherein the plurality of attributes includes a start mode attribute and the attribute value of the start mode attribute includes a setting item for designation of a print job start time.

2. An apparatus according to claim 1, wherein said second acquiring unit acquires a plurality of the attribute values which correspond to the software.

3. A printer capable of communicating with an information processing apparatus, comprising:
    a first output unit adapted to output an attribute list including a plurality of attributes supported by said printer to the information processing apparatus, so as to allow the information processing apparatus to determine for each of the plurality of attributes included in the attribute list whether the attribute corresponds to software that operates on the information processing apparatus and provide a request for an attribute value of one of the plurality of attributes determined to correspond to the software;
    a second output unit adapted to output the attribute value to the information processing apparatus in response to the request provided by the information processing apparatus, so as to allow the information processing apparatus to control a setting screen of the software to reflect the attribute value, generate a print job based on a setting entered via the setting screen that has reflected the attribute value and output the generated print job to said printer; and
    a reception unit adapted to receive the print job from the information processing apparatus,
    wherein the plurality of attributes includes a start mode attribute and the attribute value of the start mode attribute includes a setting item for designation of a print job start time.

4. A printer according to claim 3, wherein said second output unit outputs a plurality of the attribute values which correspond to the software.

5. A method of communicating with a printer by an information processing apparatus, comprising:
    a first acquiring step of acquiring from the printer an attribute list including a plurality of attributes supported by the printer;
    a determining step of determining for each of the plurality of attributes included in the attribute list acquired in said first acquiring step whether the attribute corresponds to software that operates on said information processing apparatus;
    a second acquiring step of acquiring from the printer an attribute value of one of the plurality of attributes determined in said determining step to correspond to the software;
    a controlling step of controlling a setting screen of the software to reflect the attribute value acquired by said second acquiring step; and
    a job outputting step of generating a print job based on a setting entered via the setting screen that has reflected the attribute value and output the generated print job to the printer,
    wherein the plurality of attributes includes a start mode attribute and the attribute value of the start mode attribute includes a setting item for designation of a print job start time.

6. A method according to claim 5, wherein said second acquiring step acquires a plurality of the attribute values which correspond to the software.

7. A method of communicating with an information processing apparatus by a printer, comprising:
    a first output step of outputting an attribute list including a plurality of attributes supported by said printer to the information processing apparatus, so as to allow the information processing apparatus to determine for each of the plurality of attributes included in the attribute list whether the attribute corresponds to software that operates on the information processing apparatus and provide a request for an attribute value of one of the plurality of attributes determined to correspond to the software;
    a second output step of outputting the attribute value to the information processing apparatus in response to the request provided by the information processing apparatus, so as to allow the information processing apparatus to control a setting screen of the software to reflect the attribute value, generate a print job based on a setting entered via the setting screen that has reflected the attribute value and output the generated print job to said printer; and
    a reception step of receiving the print job from the information processing apparatus,
    wherein the plurality of attributes includes a start mode attribute and the attribute value of the start mode attribute includes a setting item for designation of a print job start time.

8. A method according to claim 7, wherein said second outputting step outputs a plurality of the attribute values which correspond to the software.

9. A computer program stored on a computer-readable medium for an information processing apparatus capable of communicating with a printer, comprising:
    first acquiring code for acquiring from the printer an attribute list including a plurality of attributes supported by the printer;

determining code for determining for each of the plurality of attributes included in the attribute list acquired by said acquiring code whether the attribute corresponds to software that operates on said information processing apparatus;

second acquiring code for acquiring from the printer an attribute value of one of the plurality of attributes determined by said determining code to correspond to the software;

control code for controlling a setting screen of the software to reflect the attribute value acquired by said second acquiring code; and job outputting code for generating a print job based on a setting entered via the setting screen that has reflected the attribute value and output the generated print job to the printer, wherein the plurality of attributes includes a start mode attribute and the attribute value of the start mode attribute includes a setting item for designation of a print job start time.

10. A computer program stored on a computer-readable medium according to claim 9, wherein said second acquiring code acquires a plurality of the attribute values which correspond to the software.

11. A computer program stored on a computer-readable medium for a printer capable of communicating with an information processing apparatus, comprising:

first outputting code for outputting an attribute list including a plurality of attributes supported by said printer to the information processing apparatus, so as to allow the information processing apparatus to determine for each of the plurality of attributes included in the attribute list whether the attribute corresponds to software that operates on the information processing apparatus and provide a request for an attribute value of one of the plurality of attributes determined to correspond to the software;

second outputting code for outputting the attribute value to the information processing apparatus in response to the request provided by the information processing apparatus, so as to allow the information processing apparatus to control a setting screen of the software to reflect the attribute value, generate a print job based on a setting entered via the setting screen that has reflected the attribute value and output the generated print job to said printer; and reception code for receiving the print job from the information processing apparatus, wherein the plurality of attributes includes a start mode attribute and the attribute value of the start mode attribute includes a setting item for designation of a print job start time.

12. A computer program stored on a computer-readable medium according to claim 11, wherein said second outputting code outputs a plurality of the attribute values which correspond to the software.

* * * * *